(12) United States Patent
Sohmshetty et al.

(10) Patent No.: US 11,806,861 B2
(45) Date of Patent: Nov. 7, 2023

(54) MULTI-USE MOBILE ROBOT AND METHODS OF USE

(71) Applicant: Ford Global Technologies, LLC, Dearborn, MI (US)

(72) Inventors: Raj Sohmshetty, Canton, MI (US); Justin Miller, Berkley, MI (US); Sanghyun Hong, Ann Arbor, MI (US)

(73) Assignee: Ford Global Technologies, LLC

( * ) Notice: Subject to any disclaimer, the term of this patent is extended or adjusted under 35 U.S.C. 154(b) by 970 days.

(21) Appl. No.: 16/741,438

(22) Filed: Jan. 13, 2020

(65) Prior Publication Data

US 2020/0230822 A1 Jul. 23, 2020

Related U.S. Application Data

(60) Provisional application No. 62/794,283, filed on Jan. 18, 2019.

(51) Int. Cl.

| B25J 11/00 | (2006.01) |
|---|---|
| B25J 5/00 | (2006.01) |
| G06F 21/32 | (2013.01) |
| B25J 9/08 | (2006.01) |
| B25J 13/00 | (2006.01) |
| B25J 5/06 | (2006.01) |
| B62K 7/04 | (2006.01) |
| B62B 3/00 | (2006.01) |

(Continued)

(52) U.S. Cl.
CPC ............ *B25J 11/008* (2013.01); *B25J 5/007* (2013.01); *B25J 5/06* (2013.01); *B25J 9/08* (2013.01); *B25J 13/006* (2013.01); *B62B 3/005* (2013.01); *B62B 5/0026* (2013.01); *B62K 7/04* (2013.01); *G06F 21/32* (2013.01); *A61G 5/04* (2013.01); *B62B 5/0069* (2013.01); *B62B 5/06* (2013.01); *B62B 2203/70* (2013.01)

(58) Field of Classification Search
CPC ... B25J 11/008; B25J 5/007; B25J 5/06; B25J 9/08; B25J 13/006; B62B 3/005; B62B 5/0026; B62B 5/0069; B62B 5/06; B62B 2203/70; B62K 7/04; G06F 21/32; A61G 5/04

See application file for complete search history.

(56) References Cited

U.S. PATENT DOCUMENTS 10,479,418 B1 * 11/2019 Patel .................. B65D 90/0066
2003/0156934 A1 * 8/2003 Fujita ................... B66F 17/003
414/618

(Continued)

*Primary Examiner* — Glenn F Myers
(74) *Attorney, Agent, or Firm* — Brandon Hicks; Eversheds Sutherland (US) LLP

(57) ABSTRACT

The present disclosure is directed to multi-use mobile robots that cater to both goods delivery and people mobility. These robots allow for seamless and dynamic transition between a rideable personal transport vehicle that may be driven by a user sitting in a removable robot seat, driven by the user standing onboard the vehicle, or driven by a second individual walking behind the multi-use robot. The multi-use robot may also function as an autonomous delivery vehicle, and can provide an option to allow both people and goods to be transported simultaneously. The multi-use robots can also integrate with mobile warehouses and neighborhood storage lockers and mobile warehouses, and provide last-mile handling of goods and supplies.

17 Claims, 31 Drawing Sheets

(51) Int. Cl.
*B62B 5/00* (2006.01)
*B62B 5/06* (2006.01)
*A61G 5/04* (2013.01)

(56) References Cited

U.S. PATENT DOCUMENTS

| | | | | |
|---|---|---|---|---|
| 2014/0001722 | A1* | 1/2014 | Willey | B62B 3/02 |
| | | | | 280/47.35 |
| 2014/0133943 | A1* | 5/2014 | Razumov | B65G 1/0492 |
| | | | | 414/281 |
| 2018/0237086 | A1* | 8/2018 | Evans | H02J 7/00 |
| 2018/0312068 | A1* | 11/2018 | Aiuchi | B60L 53/14 |
| 2019/0220044 | A1* | 7/2019 | Ruth | G05D 1/0276 |
| 2019/0337785 | A1* | 11/2019 | Chapman | B62B 3/001 |
| 2019/0362295 | A1* | 11/2019 | Kanitz | B60S 1/64 |
| 2020/0174494 | A1* | 6/2020 | Lessels | G06Q 50/28 |
| 2020/0206946 | A1* | 7/2020 | Bondaryk | B66F 9/20 |

\* cited by examiner

MULTI-USE MOBILE ROBOT AND METHODS OF USE

CROSS-REFERENCE TO RELATED APPLICATIONS

The present disclosure claims priority to and the benefit of U.S. provisional patent application No. 62/794,283, filed Jan. 18, 2019, which is hereby incorporated by reference herein in its entirety.

TECHNICAL FIELD

The present disclosure relates to robots, and in some embodiments, to multi-use mobile robots for transportation of goods and individuals, as well as combinations thereof.

BACKGROUND

Autonomous vehicle or robot mediated transportation of packages and human beings is becoming ubiquitous. With proliferation of these systems, various configurations of robots exist and are currently being created, but none appear to provide a single platform that is compatible for a plurality of uses, including both goods delivery and human transport. Existing goods delivery robots have random shapes and sizes which suggest that they are being developed in isolation, and further without consideration for the entire ecosystem of goods delivery and/or human transport.

Autonomous mobile robots are expected to play a significant role in the future in last mile goods mobility and people mobility. If widespread adaption of these mobile robots occurs, there will be space and congestion issues in urban areas and distance and asset utilization issues in suburban/rural areas. Current mobile robot build configurations indicating random shapes and sizes for these vehicles and the micro-transit landscape with its lack of integration across the entire goods or transportation eco-system are problematic. Further, scheduling and routing optimization under the current scenario will pose significant logistical and efficiency challenges with many asynchronously different types of special purpose last mile goods and people transportation vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
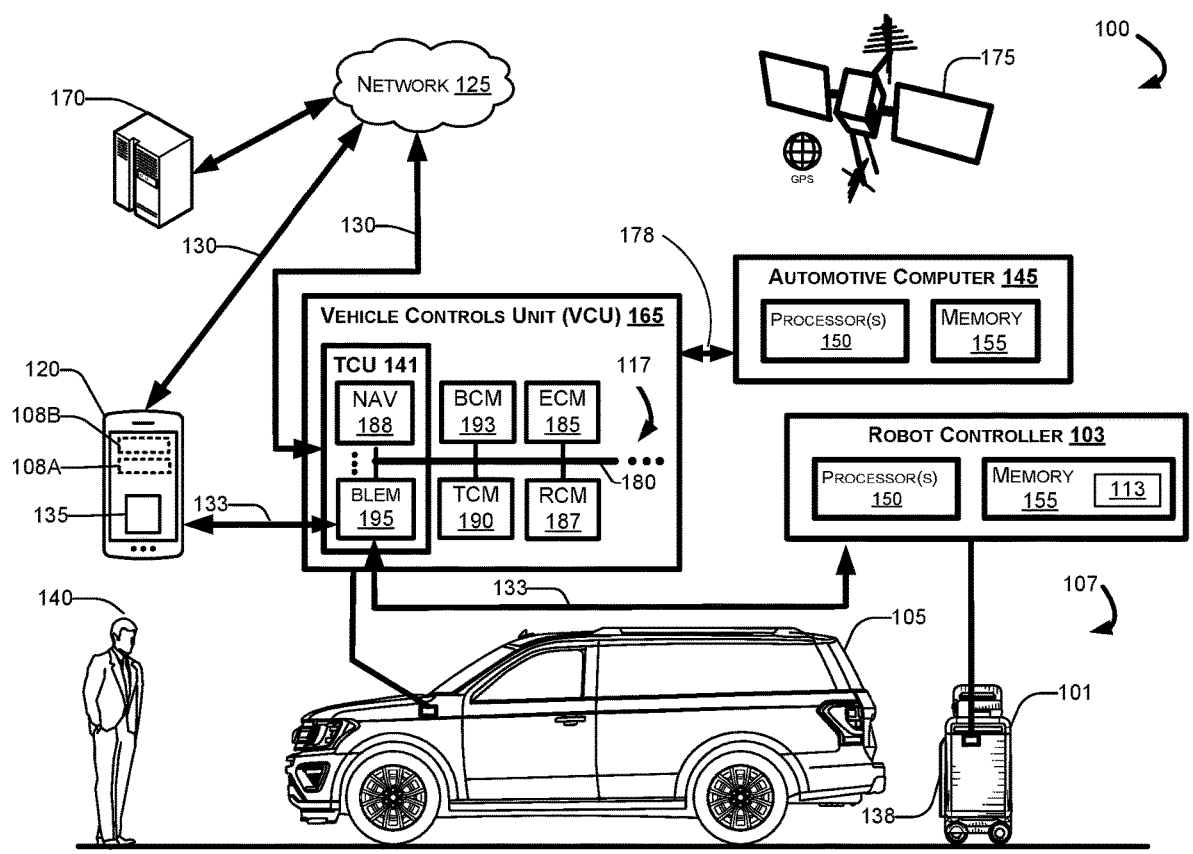
FIG. 1 depicts an example computing environment in accordance with embodiments of the present disclosure.

The present disclosure is directed to multi-use mobile robots that cater to both goods delivery and people mobility. These robots allow for seamless and dynamic transition between a rideable personal transport vehicle that may be driven by a user sitting in a removable robot seat, driven by the user standing onboard the vehicle, or driven by a second individual walking behind the robot. The multi-use robot may also function as an autonomous or manually controlled delivery vehicle, and can provide an option to allow both people and goods to be transported simultaneously. The multi-use robots can also integrate with mobile warehouses and neighborhood storage lockers and mobile warehouses, and provide last-mile handling of goods and supplies. FIG. 1 depicts an example computing environment 100 that can include a delivery vehicle 105 comprising an automotive computer 145, and a Vehicle Controls Unit (VCU) 165 that typically includes a plurality of electronic control units (ECUs) 117 disposed in communication with the automotive computer 145 and a robot controller 103. A mobile device 120 (which may be associated with a user 140), a multi-use mobile robot 101 and the delivery vehicle 105, may connect with the automotive computer 145 using wired and/or wireless communication protocols and transceivers. The mobile device 120 may be communicatively coupled with the delivery vehicle 105 via one or more network(s) 125, which may communicate via one or more wireless channel(s) 130, and/or may connect with the delivery vehicle 105 directly using near field communication (NFC) protocols, Bluetooth® protocols, Wi-Fi, Ultra-Wide Band (UWB), and other possible data connection and sharing techniques. The delivery vehicle 105 may also receive and/or be in communication with a Global Positioning System (GPS) 175.

Although illustrated as a sport utility, the delivery vehicle 105 may take the form of another passenger or commercial automobile such as, for example, a car, a truck, a crossover vehicle, a van, a minivan, a cargo truck, a service vehicle, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configurations, the delivery vehicle 105 may configured as an electric vehicle (EV). More particularly, the delivery vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The delivery vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the delivery vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, a multi-use robotic control system (hereafter "control system" 107) may be configured to operate with a delivery vehicle or a mobile warehouse vehicle having a Level-1-Level-5 autonomous vehicle controller. Accordingly, the control system 107 may provide some aspects of human control to the delivery vehicle 105, when the vehicle is configured as an AV.

The mobile device 120 generally includes a memory 108A for storing program instructions associated with an application 135 that, when executed by a mobile device processor 108B, performs aspects of the disclosed embodiments. The application (or "app") 135 may be part of the control system 107, or may provide information to the control system 107 and/or receive information from the control system 107.

In some aspects, the mobile device 120 may communicate with the delivery vehicle 105 through the one or more wireless channel(s) 130, which may be encrypted and established between the mobile device 120 and a Telematics Control Unit (TCU) 141. The mobile device 120 may communicate with the TCU 141 using a wireless transmitter (not shown in FIG. 1) associated with the TCU 141 on the delivery vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more connections 133, which may take any communication infrastructure, but are typically wireless channels. The connection(s) 133 may include various low-energy protocols including, for example, Bluetooth®, BLE, or other Near Field Communication (NFC) protocols.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the delivery vehicle 105 (or elsewhere in the delivery vehicle 105) and operate as a functional part of the control system 107, in accordance with the disclosure. The automotive computer 145 may include one or more processor(s) 150 and a computer-readable memory 155. The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the delivery vehicle 105 and other vehicles (not shown in FIG. 1) that may be part of a vehicle fleet, which may include robot(s), delivery vehicles, autonomous drones, and other devices.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 180 (hereafter "bus 180"), and may be configured to coordinate the data between delivery vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, a TCU 141, a Restraint Control Module (RCM) 187, etc. In some aspects, the VCU 165 may control aspects of the delivery vehicle 105, and implement one or more instruction sets received from the application 135 operating on the mobile device 120, from one or more instruction sets received from the control system 107, and/or from instructions received from an AV controller, such as an AV controller discussed with respect to FIG. 2.

The TCU 141 can be configured to provide vehicle connectivity to wireless computing systems onboard and offboard the delivery vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the delivery vehicle 105 and other systems, computers, and modules. The TCU 141 may be disposed in communication with the ECUs 117 by way of a bus 180. In some aspects, the TCU 141 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the control system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the control system 107, and/or via wireless signal inputs received via the connections 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the delivery vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable actuators associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, VCU 165, and/or the control system 107 may omit certain computing modules. It should be understood that the computing environment depicted in FIG. 1 is one example of a possible implementation according to the present disclosure, and thus, it should not to be considered limiting or exclusive.

Figure 2:
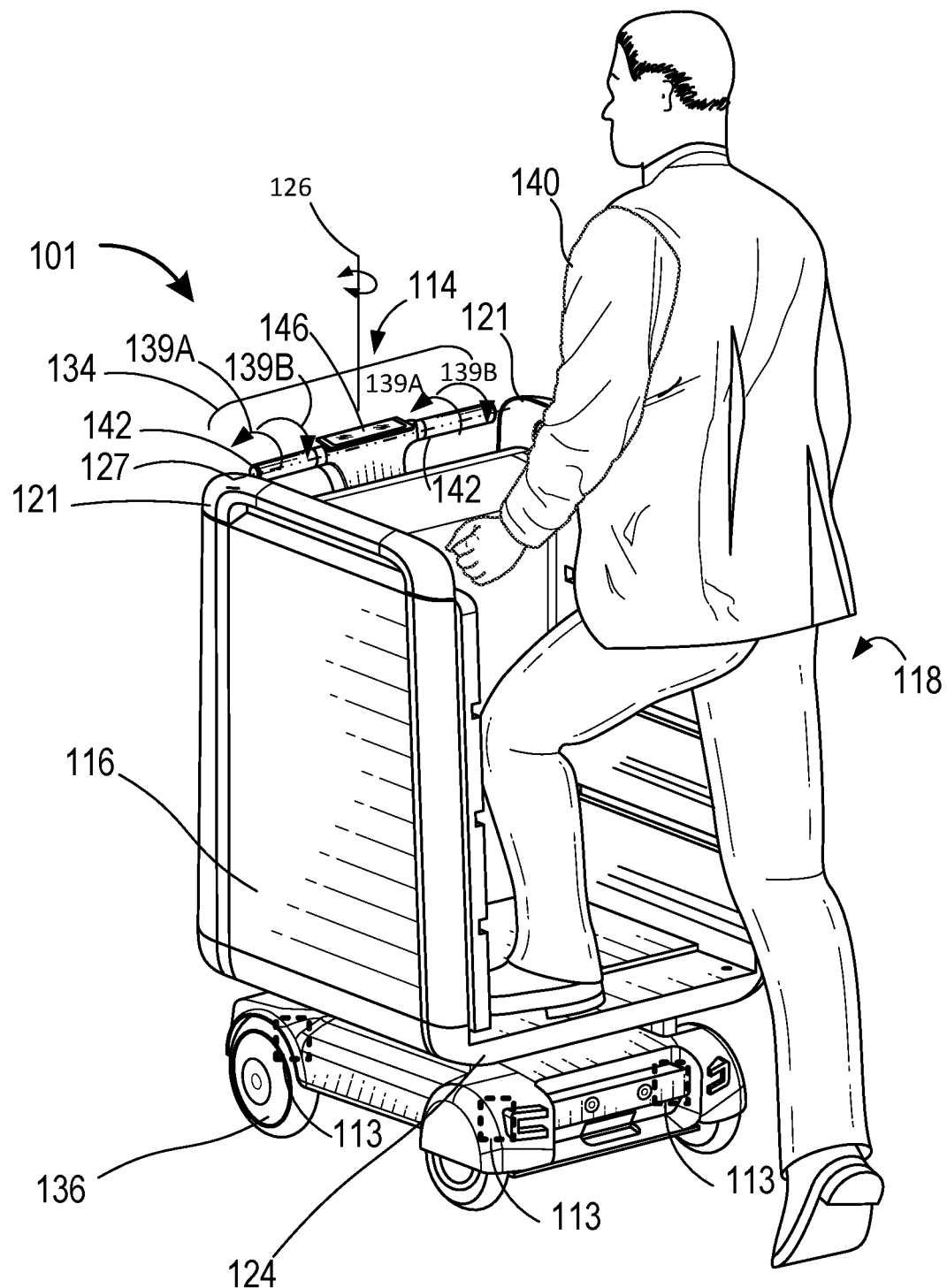
FIG. 2 depicts a view of an example multi-use mobile robot used as a transport device according to an embodiment of the present disclosure.
Figure 12:
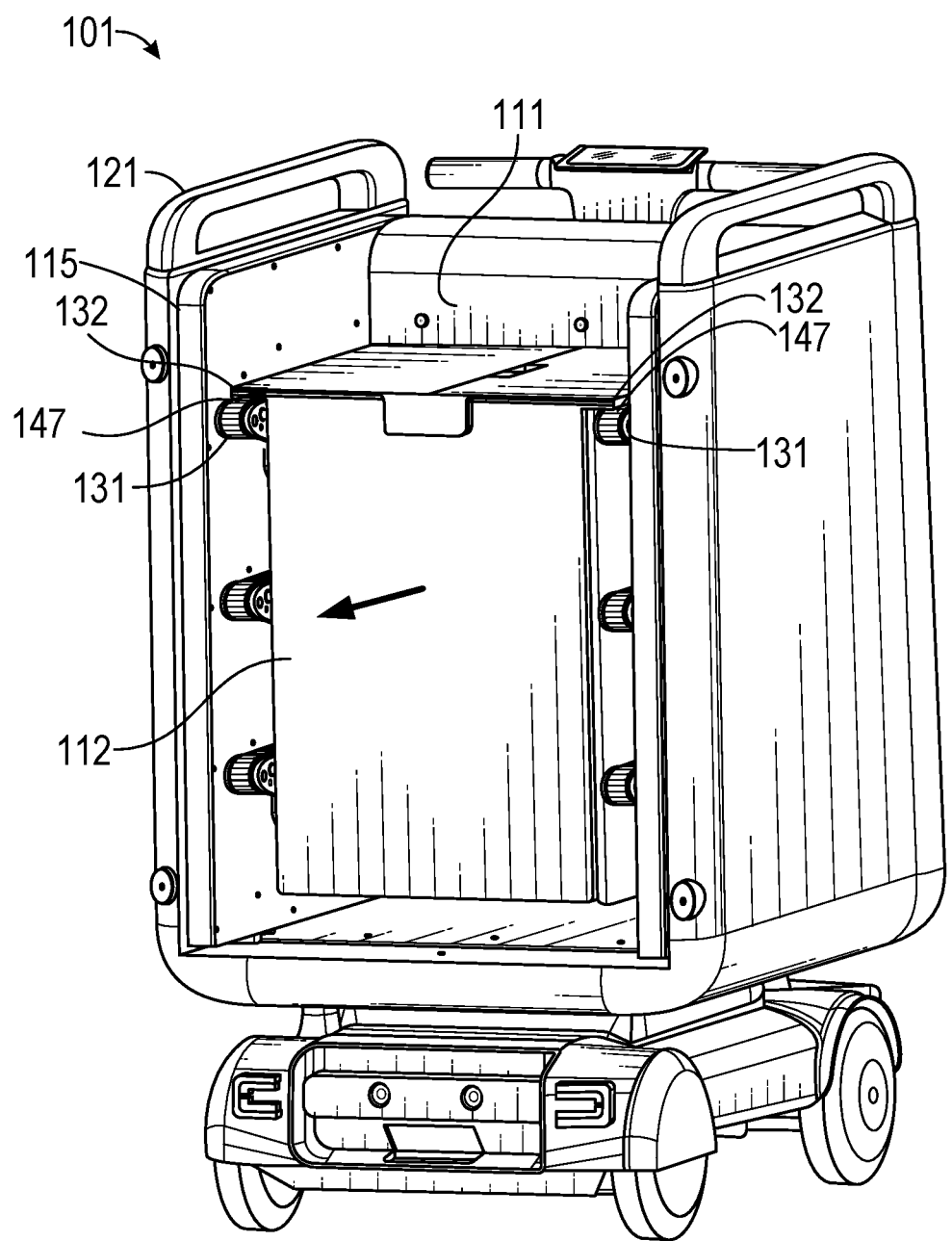
FIG. 12 depicts another embodiment where the telescoping internal frame 115 includes a plurality of slots integrated into the internal frame sidewall panels 109 and 110 in accordance with embodiments of the present disclosure.
Figure 24:
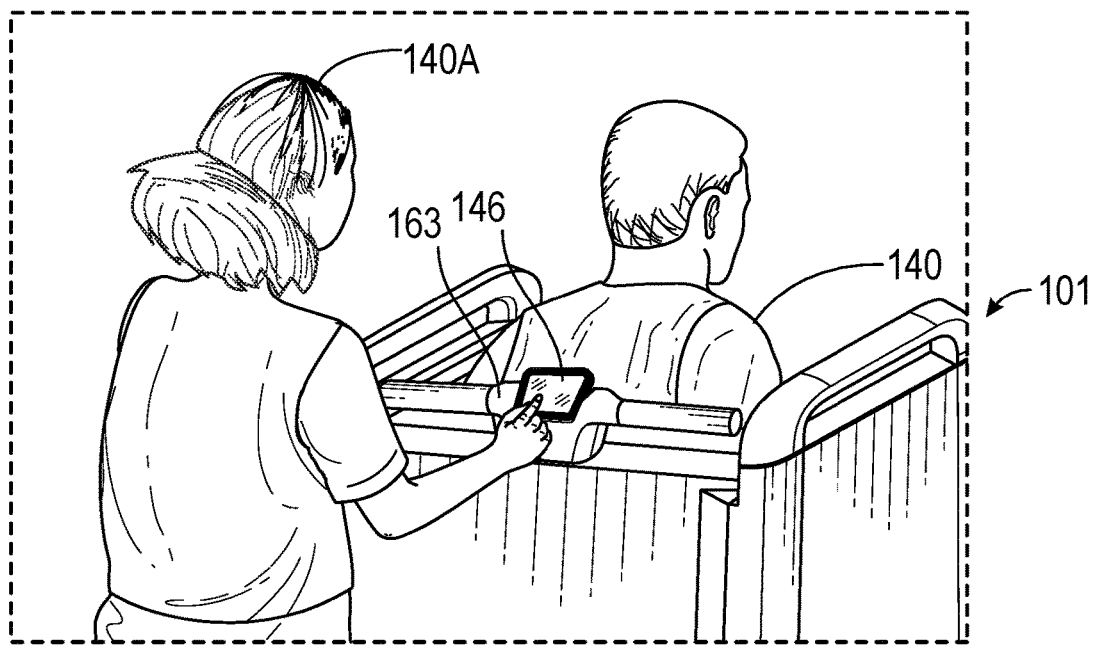
FIG. 24 depict the robot in a various human transport mode, where a user can sit in/on the robot and be transported by another user that can control the robot as they walk behind the robot, or can operate the robot while riding in the robot using a wireless control unit in accordance with embodiments of the present disclosure.
Figure 25:
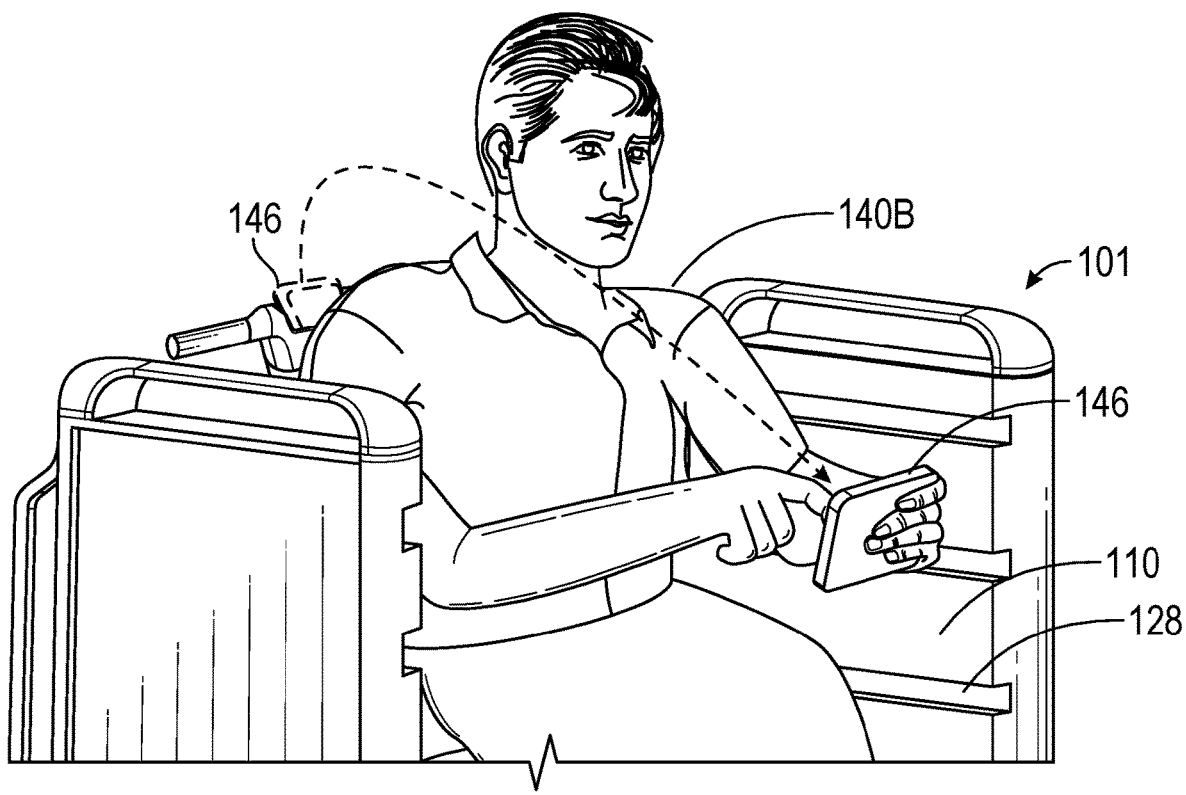
FIG. 25 illustrates the user 140 independently utilizing the robot 101 in a wheelchair configuration in accordance with embodiments of the present disclosure.
Figure 30:
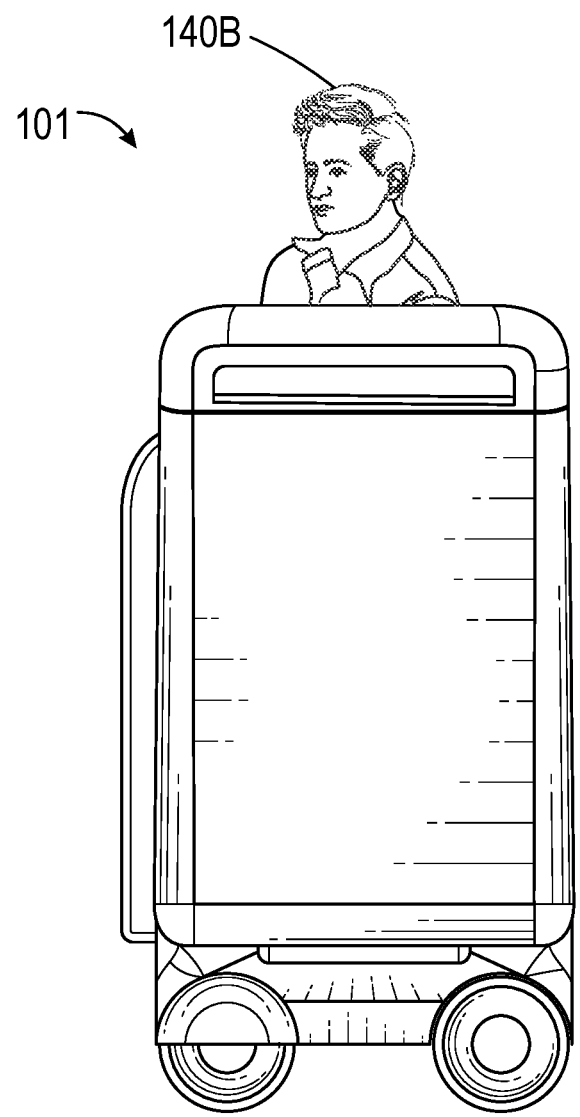
FIG. 30 illustrates the seated in the robot while utilizing the robot as a personal transport vehicle in accordance with embodiments of the present disclosure.
Figure 32:
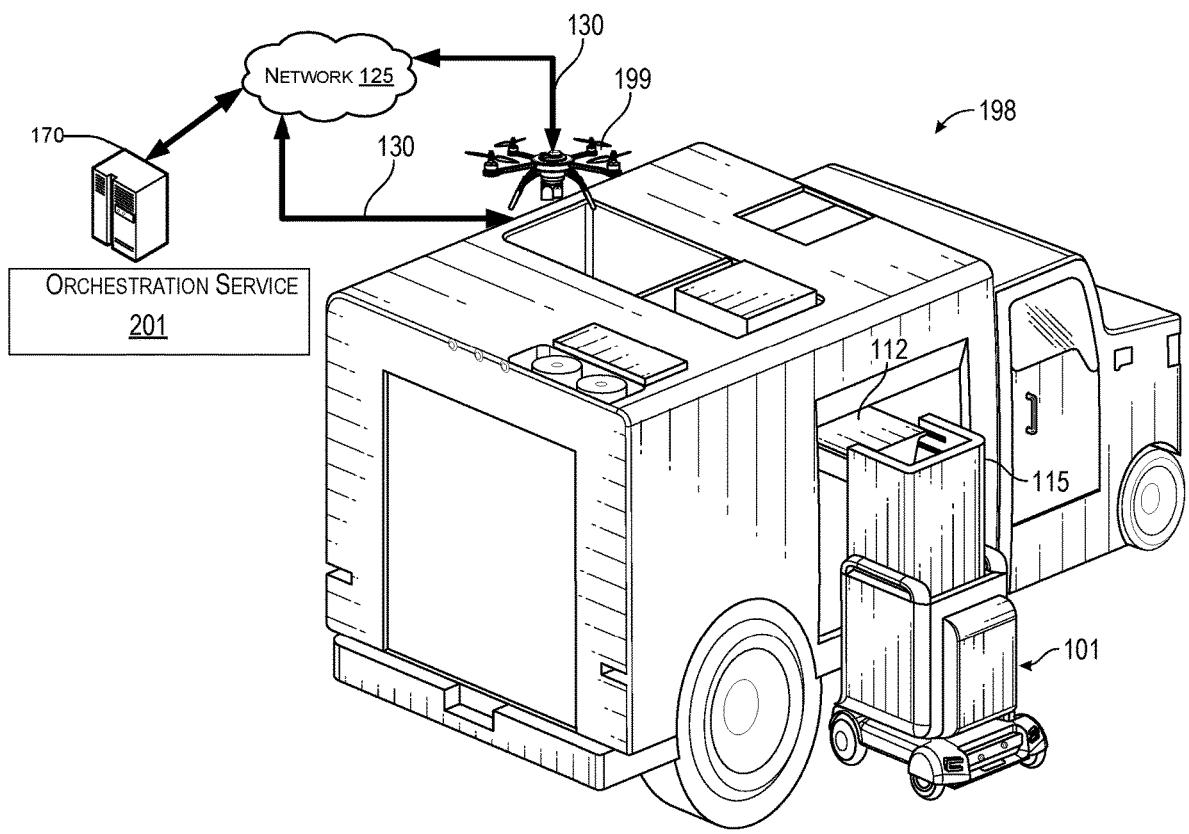
FIG. 32 depicts the robot loading a container into another delivery vehicle in accordance with embodiments of the present disclosure.

FIG. 2 depicts a view of an example multi-use mobile robot (hereafter "robot 101") used as a transport device according to an embodiment of the present disclosure. The figures of the present disclosure describe various multiple uses for the robot 101 that can include, human transport as shown in FIG. 2 (among other figures), goods delivery as shown in FIG. 12, human patient transport controlled by a caregiver as shown in FIG. 24, self-controlled human patient transport as shown in FIG. 25, and autonomous goods transfer and delivery as shown in FIG. 32. The robot 101 may perform goods transfer and delivery as a single unit, or as part of a plurality of delivery vehicles and devices such as a non-telescoping goods delivery robot as shown in FIG. 30, a mobile warehouse vehicle as shown in FIG. 32, a delivery vehicle as shown in FIG. 1, or other delivery vehicles, robots, and devices.

The control system 107 can actuate the motor (not shown in FIG. 2) to rotate the wheel(s) 136 based on input received through a steering mechanism 114 and/or the wireless and/or wired control unit 146. In some embodiments, the wheel(s) 136 can be angled or turned based on steering linkages (not shown in FIG. 2) that couple the steering mechanism 114 and the wheel(s) 136. In other embodiments, the wheel(s) 136 can be angled or turned using a linear actuator such as a piston, based on input received from the wireless control unit 146. Alternatively, the robot 101 can include a mechanism (not shown in FIG. 2) that turns the steering linkage coupled to the wheel(s) 136 based on input received from the wireless control unit 146.

The steering mechanism 114 may further include a rotatable control bar 134 disposed on a steering mechanism axis 126 that may be rotated about the steering mechanism axis 126 to control directional changes by steering left, right or straight. The steering mechanism 114 can be pivoted forward (A) or backwards (B) about a central axis 127 to initiate forward or reverse operation of the robot 101, which allows for control of the robot in a forward motion by rotating the rotatable control bar 134 about the central axis 127 in a first direction 139A, or in a second direction 139B. Steering control of the robot 101 may be available to users by rotating the rotatable control bar 134, and more particularly, with rotation of one or more of handles 142 disposed on the rotatable control bar 134 about the steering mechanism axis 126 of the rotatable control bar 134. The steering mechanism 114 can be directly or indirectly connected to the front wheels, back wheels or both the front and back wheels 136, such that turning of the rotatable control bar 134 causes a corresponding system response that causes one or more actuator(s) 113 to apply rotational drive force that turns the front wheels of the robot 101 such that the robot steers in the desired direction corresponding with the turn of the rotatable control bar 134.

In an example, the handles 142 may be rotatable (e.g., 139A, 139B) to control forward and reverse movement of the robot 101. In an example embodiment, by rotating one or both of the rotatable handles 142 in a first direction 139A, the steering mechanism 114 may signal the wireless control unit 146 to actuate the wheel actuator(s) 113 to turn one or more of the wheels 136 to move the robot in a first direction (e.g., forward with respect to the user 140 riding inside of the robot 101). In an example implementation, the control unit 146 may increase the speed linearly with the degree of rotational action applied to the handles 142. By releasing one or more of the handles 142, the steering mechanism 114 may signal the wireless control unit to stop the wheel actuator(s) 113 by reducing or stopping motive power to the actuator(s). By rotating the handles in the second (opposite) direction 139B, the steering mechanism 114 may signal the wireless control unit 146 to actuate the wheel actuator(s) 113 to turn one or more of the wheels 136 to move the robot in a second direction (e.g., reverse with respect to the user 140 riding inside of the robot 101).

By steering the robot using the steering mechanism 114, similar to steering a bicycle, the robot 101 may convey itself in a forward or backward direction at a desired angle commensurate with a corresponding degree of turn of the rotatable control bar 134. For example, the steering mechanism 114 may be rotatable to the left or right to steer the robot. Other steering configurations are possible and contemplated, including, for example, a wheel, a joystick, a set of buttons, etc.

Figure 7:
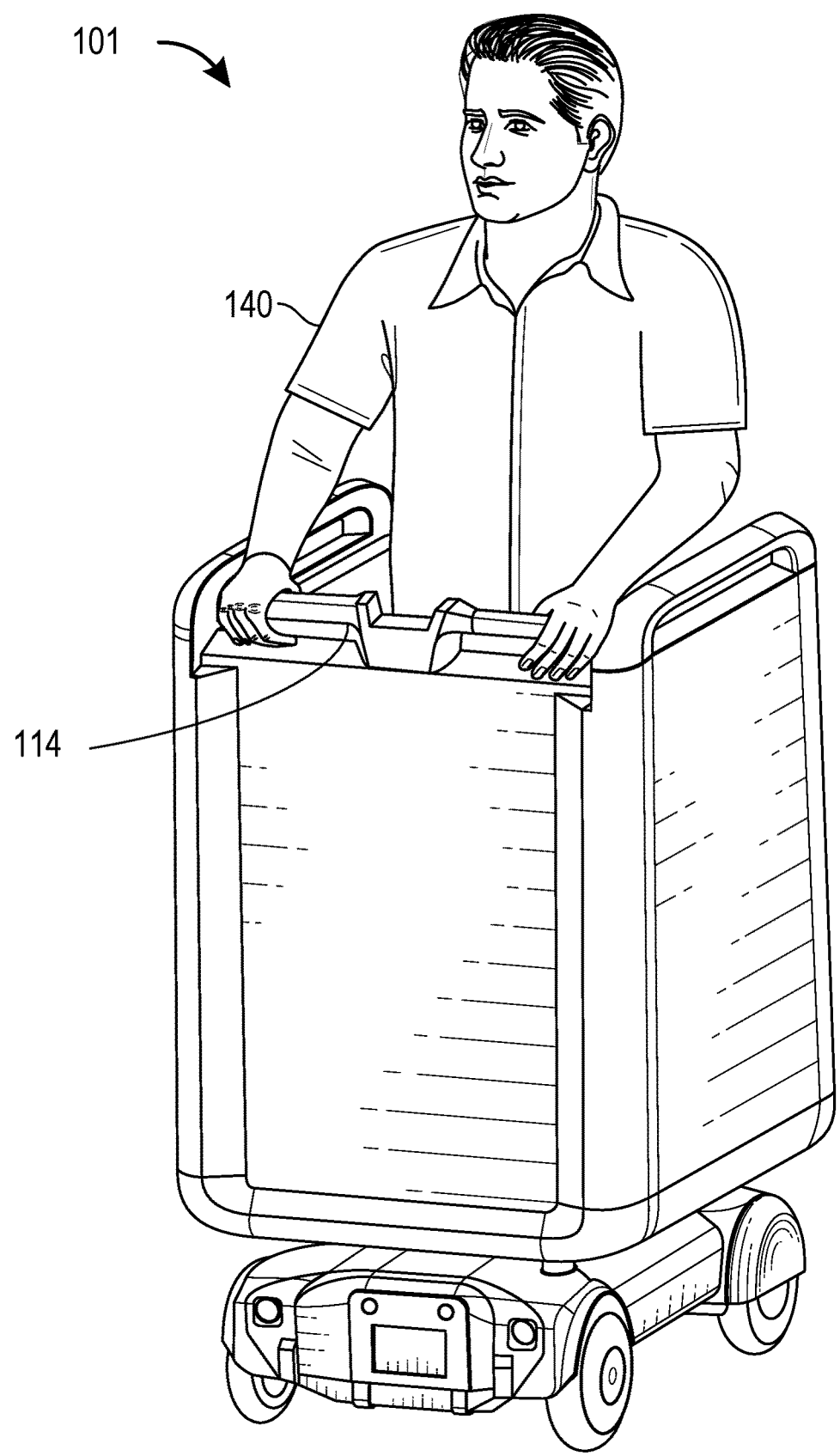
FIG. 7 illustrates a user utilizing the robot as a personal transportation device in accordance with embodiments of the present disclosure.
Figure 10:
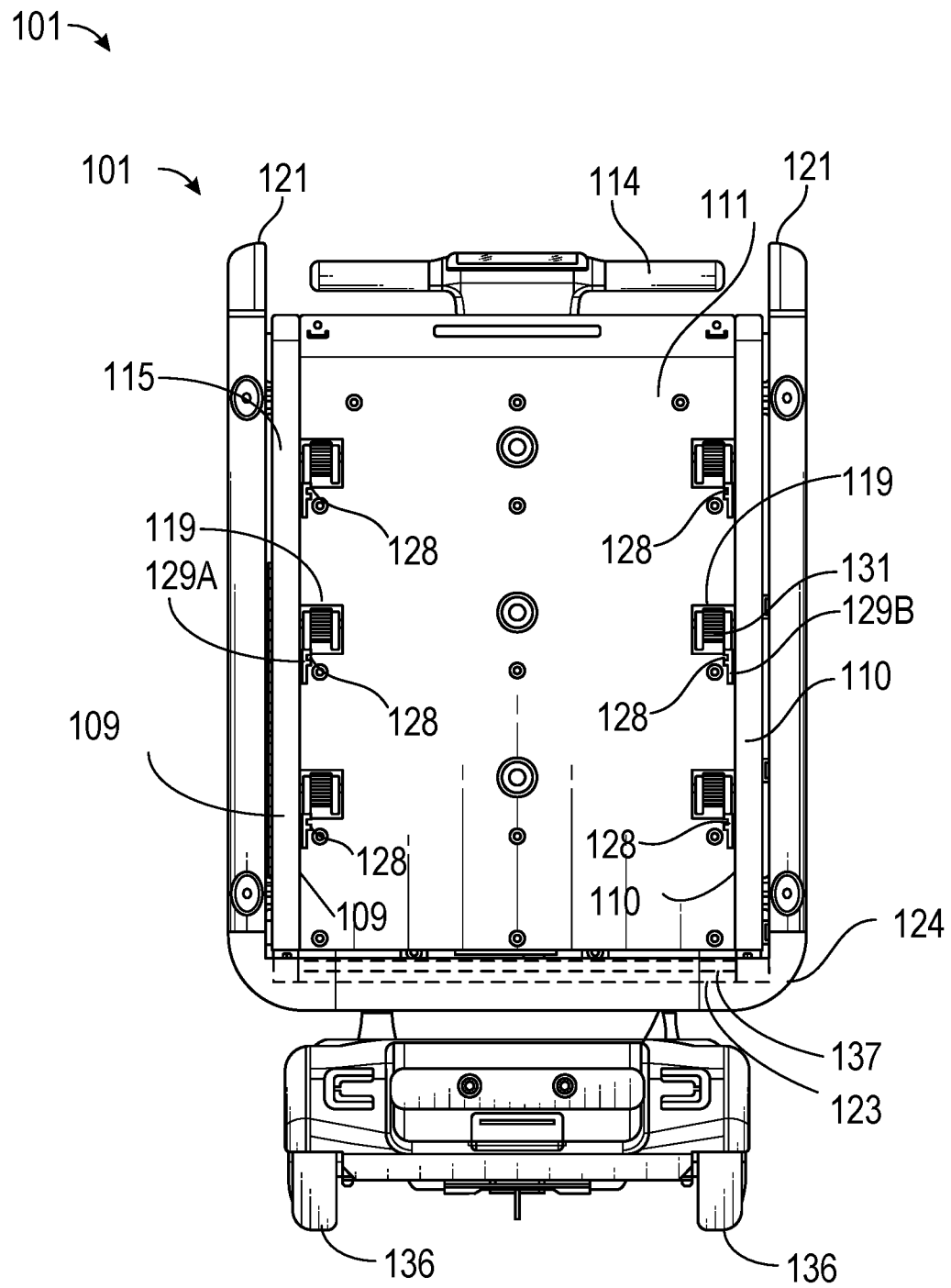
FIG. 10 depicts a front view of the robot in accordance with embodiments of the present disclosure.
Figure 29:
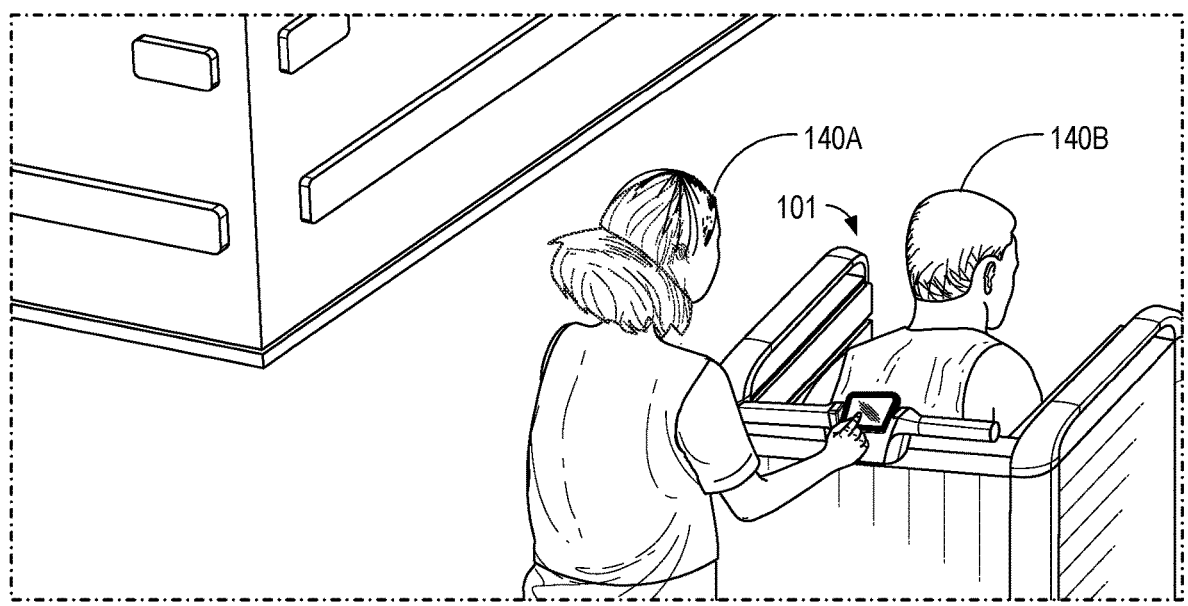
FIG. 29 illustrates a caregiver or second user controlling the robot to lower a patient to a desired height in accordance with embodiments of the present disclosure.

One advantage of positioning the steering mechanism 114 at a top surface of the telescoping internal frame 115 (as shown in FIG. 10) is to provide control ability to the user (as shown in FIGS. 1 and 7) while riding inside of the robot 101, or to provide the control ability to a second person operating the robot 101 from outside of the robot 101 (e.g., as shown in FIG. 29). The robot 101 may also be controlled in other ways, such as via the wireless control unit 146, depicted hereafter in FIG. 25.

As depicted in FIG. 2, the user 140 is depicted stepping into a base platform 124 to use the robot 101 in transport mode. When in transport mode, the robot 101 may function as a personal transport vehicle such that the user 140 may travel distances that are limited only by the available charge in a rechargeable battery bank onboard the robot 101 (see, for example, FIG. 6). In general, the robot 101 can include three exterior sidewall panels including a front exterior sidewall panel 122 (not shown in FIG. 2), a left exterior sidewall panel 116, and a right exterior sidewall panel 118, that collectively form left, right, and front exterior sides of the robot 101. The front exterior sidewall panel 122 (not shown in FIG. 2) and the two exterior sidewall panels 116 and 118 may be disposed rigidly attached to the base platform 124 to form a partial enclosure inside of which packages or riders may reside while the robot is in use.

The two exterior sidewall panels 116 and 118 (not viewable in FIG. 2, but located on an opposite side of the robot with respect to the left exterior sidewall panel 116) can include a handle 121 disposed on a top portion of the respective sidewall panels that may be utilized for human rider support. In another embodiment, the handle(s) may be disposed on a top portion of a left and right internal frame sidewall panels 109, and 110, respectively (as shown in FIG. 10). One advantage of mounting the handles 121 to the telescoping internal frame 115 includes adjustability of the holding surfaces (e.g., the handles 121) such that a vertical height of the handles 121 may be adjusted by extending the telescoping internal frame 115 vertically (discussed in detail hereafter). Control of the telescoping internal frame height may be provided through a user interface (not shown in FIG. 2) operating on the robot controller 103, e.g., via the wireless control unit 146.

When stepping into the robot 101, the user 140 may stand on the base platform 124 between the internal frame sidewall panels 109 and 110, and control the robot 101 using the steering mechanism 114. FIG. 7 depicts a front view of the user 140 riding in the robot 101 and steering the robot using the steering mechanism 114.

Figure 4:
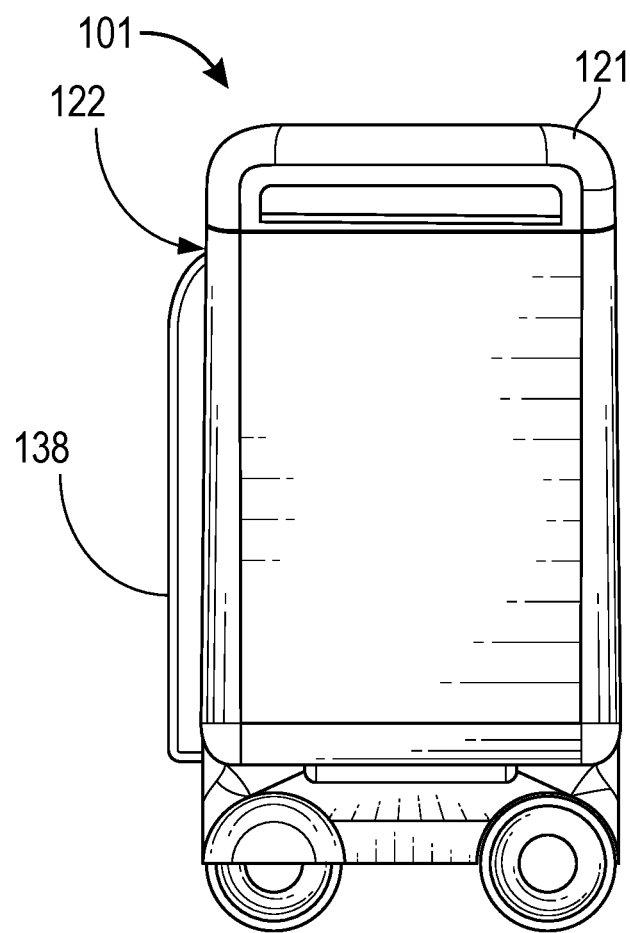
FIG. 4 depicts a sideview of the robot, illustrating one possible configuration of the replaceable battery disposed on the front exterior sidewall panel in accordance with embodiments of the present disclosure.

The base platform 124 may include one or more actuators such as one or more wheel actuators 113 (illustrated as dashed line squares) that may be disposed in communication with the robot controller 103 and a power bus (not shown in FIG. 2) disposed on a front exterior sidewall panel (or another location of the robot 101) connecting the wheel actuators 113 to a power supply (see FIG. 4, for example). An example power supply may include one or more replaceable batteries 138, as shown hereafter with respect to FIGS. 4, 6, and others. The wheel actuators 113 may receive a control command from the steering mechanism 114 and/or the robot controller 103 for forward, reverse, turning motions, etc.

Figure 3:
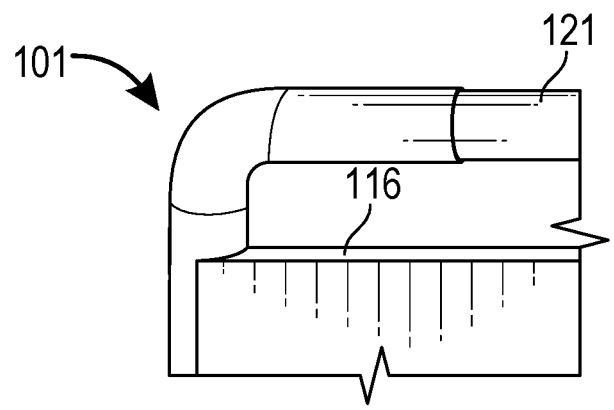
FIG. 3 illustrates a detailed view of a handle disposed on a top portion of the left internal frame sidewall panel in accordance with embodiments of the present disclosure.

FIG. 3 illustrates a detailed view of the handle 121 disposed on a top portion of the left internal frame sidewall panel 109 (not shown in FIG. 3).

FIG. 4 depicts a sideview of the robot 101, illustrating the handle 121 at a top sidewall portion of the robot 101, and one possible configuration of a replaceable battery 138 disposed on the surface of the front exterior sidewall panel 122, disposed on a front face of the robot 101.

Figure 5:
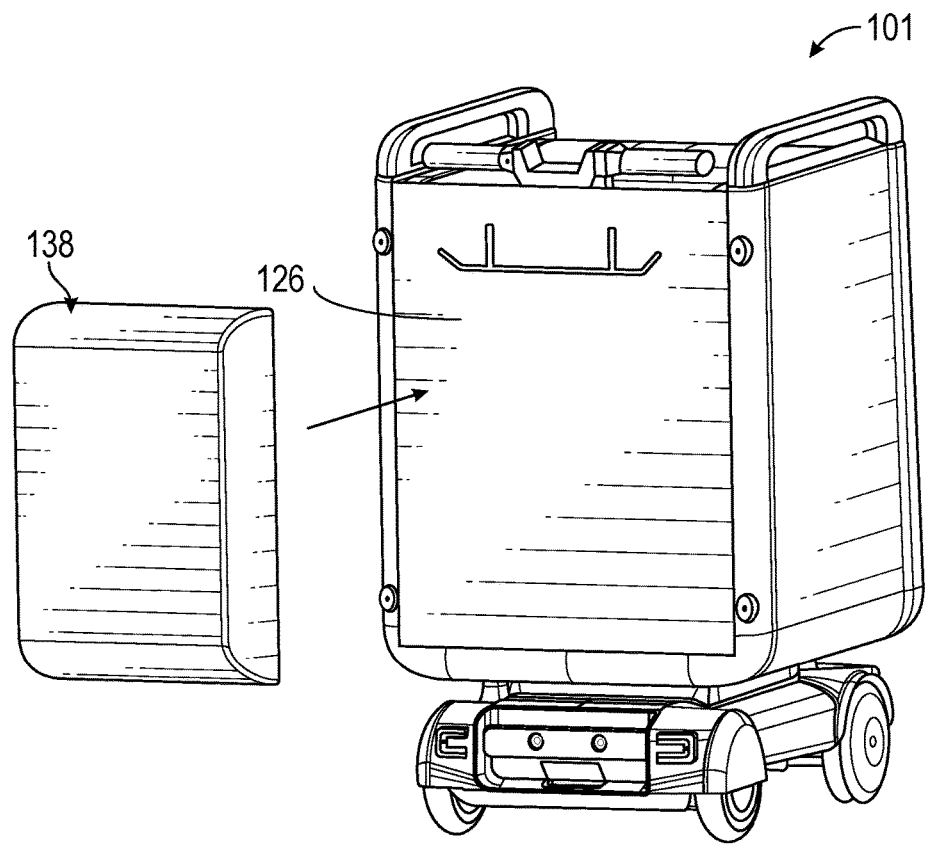
FIG. 5 illustrates a view of the replaceable battery in accordance with embodiments of the present disclosure.

FIG. 5 illustrates an expanded view of the replaceable battery 138. In one or more embodiments, the robot 101 can include a battery bank that includes one or more replaceable batteries such as the replaceable battery 138. Additional details regarding the replaceable battery 138 can be found in co-pending U.S. patent application Ser. No. 16/232,582, titled "SYSTEMS AND METHODS FOR EFFICIENT POWER MANAGEMENT OF MODULAR MOBILE ROBOT PLATFORMS WITH REPLACEABLE BATTERIES", filed on Dec. 26, 2018, and PCT Application Serial Number PCT/US2018/042943, filed on Jul. 19, 2018, titled "SWAPPABLE BATTERY SYSTEM", which are hereby incorporated by reference herein in their entireties including all references and appendices cited therein, for all purposes.

Figure 6:
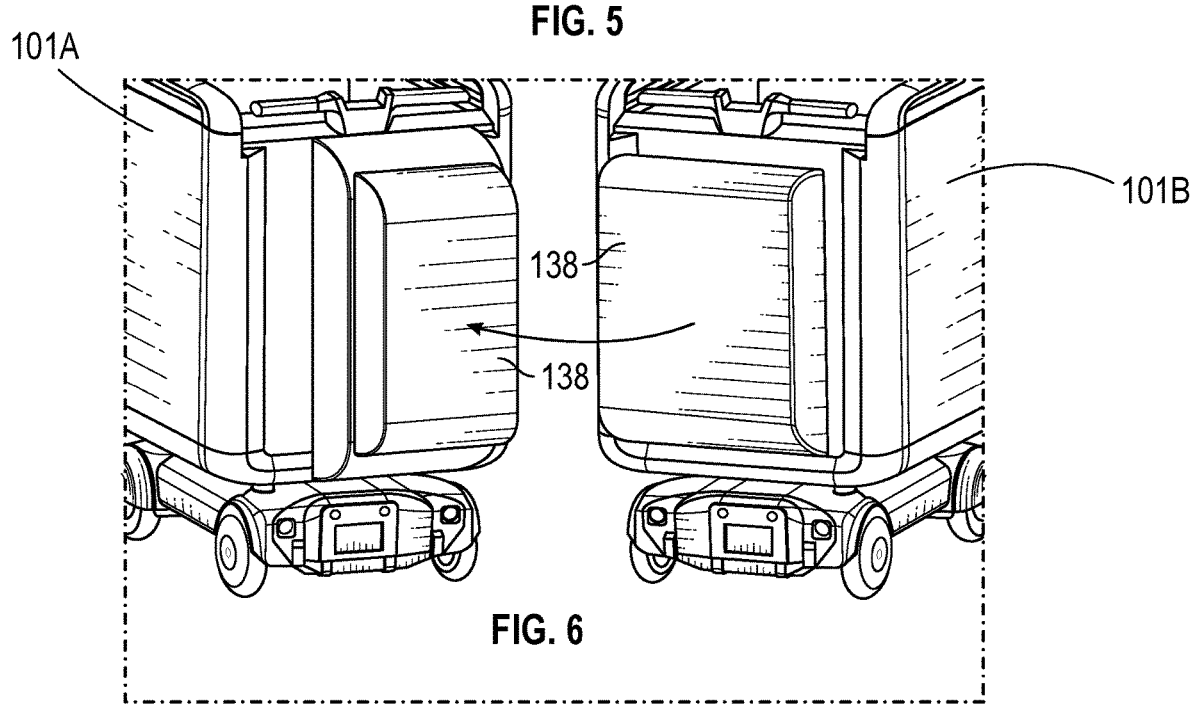
FIG. 6 depicts a first robot transferring a replaceable battery to a second robot in accordance with embodiments of the present disclosure.

In one example embodiment, the replaceable battery 138 may be removably disposed on the front exterior sidewall panel 122 of the robot 101. In other aspects, the replaceable battery 138 may be replaceable by transferring the battery from a first robot 101A to a second robot (e.g., the robot 101B), as depicted in FIG. 6. Accordingly, the replaceable battery 138 may provide power to the robot 101 for control of a robot operating system, programming code, onboard computers, and drive mechanisms that convey the robot 101, as well as people and goods onboard the robot 101.

FIG. 7 illustrates the user 140 utilizing the robot 101 as a personal transportation device. More specifically, in FIG. 7, the user 140 is utilizing a steering mechanism 114 to control movement of the robot 101. Example uses may be personal transport in a warehouse, on a city street or pedestrian walkway, or in other similar locations.

Figure 8:
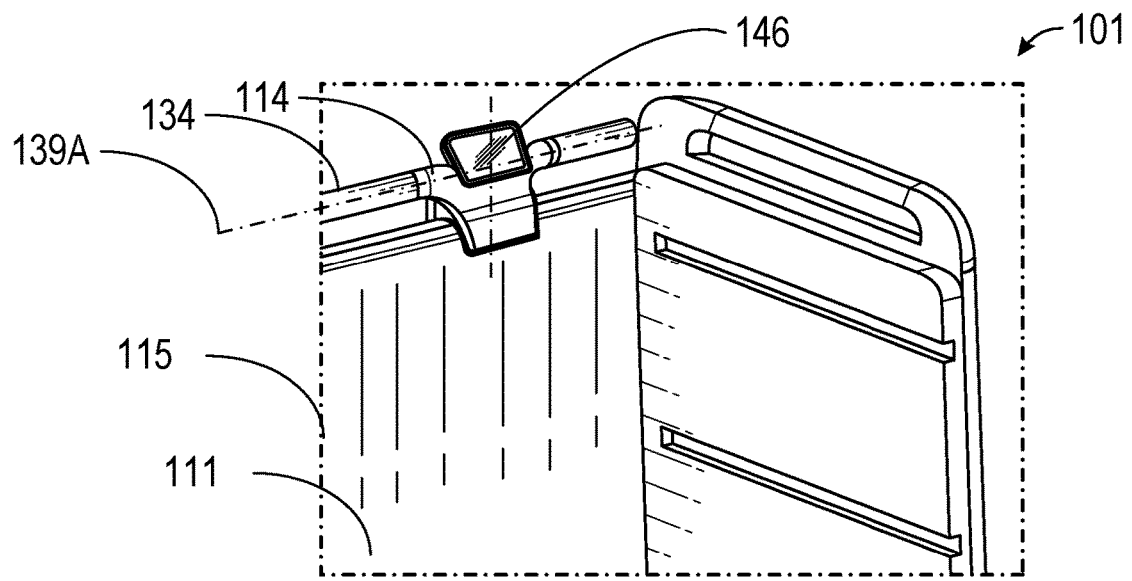
FIG. 8 depicts a partial view of the rotatable control bar 134 in accordance with the present disclosure.

FIG. 8 depicts the robot 101 having a plurality of slots 128 disposed in the left telescoping frame panel and the right telescoping internal frame sidewall panel 110, in lieu of conveyor mechanisms. Accordingly, the slots 128 may be configured in substantially parallel pairs to support a payload such as the container 112 or the foldable seat 192.

Figure 9:
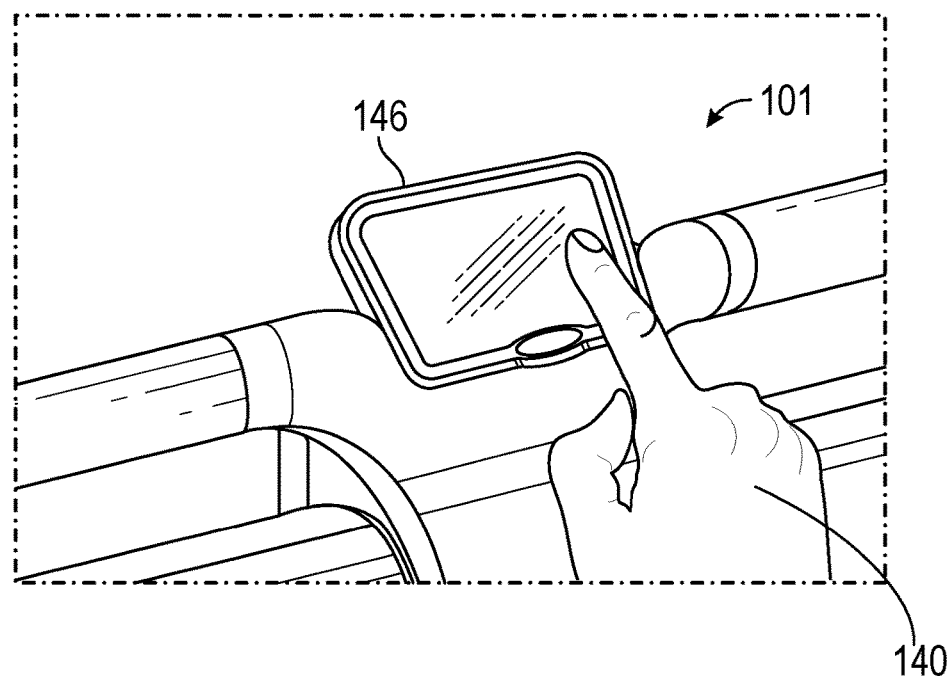
FIG. 9 depicts the user 140 selecting a control feature in accordance with embodiments of the present disclosure.

FIG. 9 depicts the user 140 selecting a control feature (control features not shown in FIG. 9) that causes the robot 101 to react in some way. In one embodiment, which is not intended to be limiting, the wireless control unit 146 may be a mobile device such as, for example, the mobile device 120 as depicted in FIG. 1, an integrated wired or wireless control panel, or another configuration known in the art of electromechanical control systems.

Figure 13:
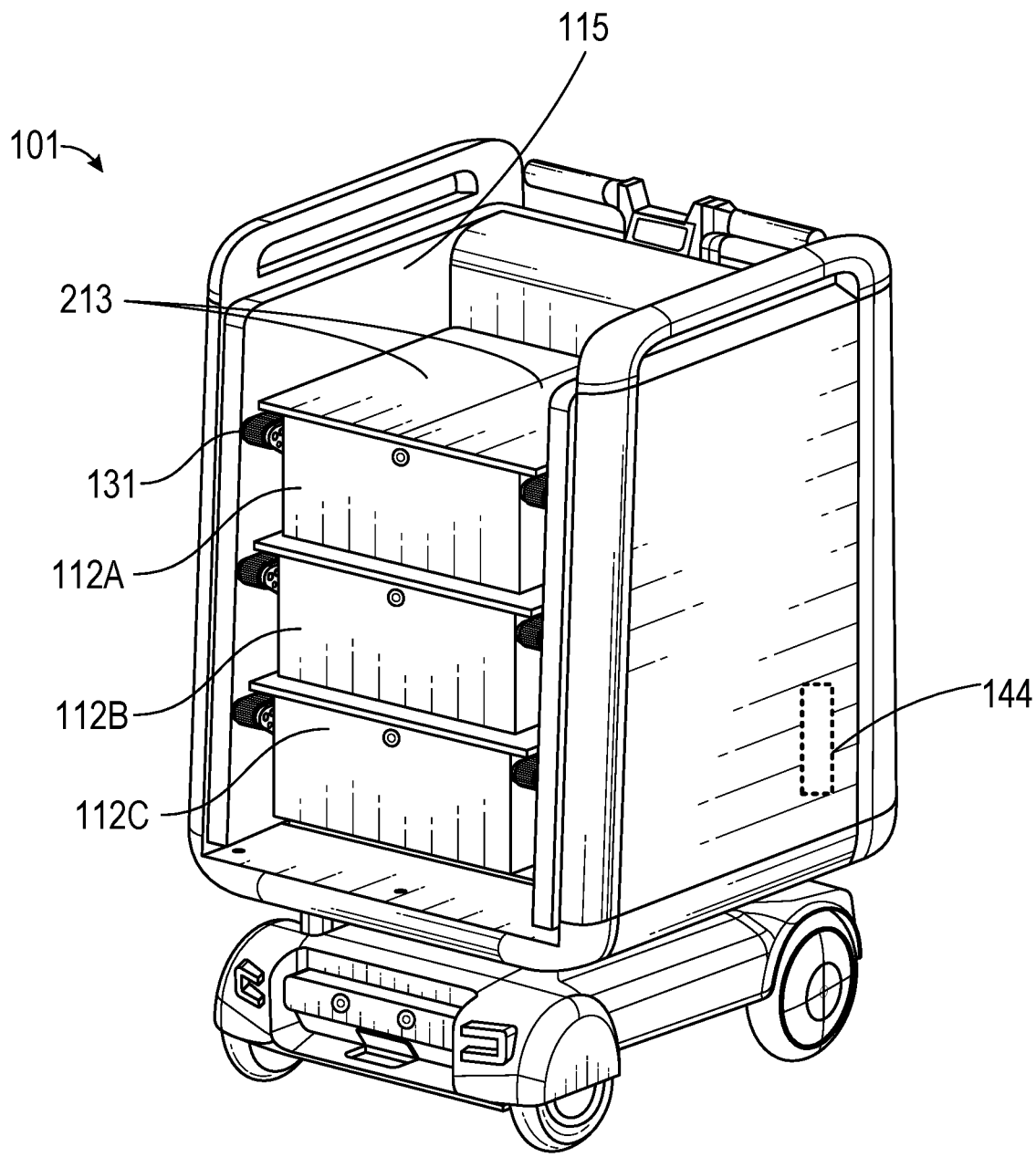
FIG. 13 depicts the robot having three containers disposed on opposing pairs of conveyor mechanisms in accordance with embodiments of the present disclosure.

FIG. 10 depicts a front view of the robot 101. In some embodiments, the robot 101 may include a telescoping internal frame 115 disposed on an interior of the robot 101 that can be actuated using a telescoping internal frame actuator 144 (as shown in FIG. 13) to adjust a vertical height of the telescoping internal frame 115 toward and away from the base platform 124, such that the telescoping internal frame 115 extends vertically to align removable storage containers (e.g., one or more container(s) 112 depicted with respect to FIG. 12, among others) with a receiving device associated with another robot (not shown in FIG. 10) vehicle. FIG. 12, discussed hereafter, depicts the robot 101 having the telescoping internal frame 115 extended in a telescoped position with respect to a base platform 124 of the robot 101.

Figure 11:
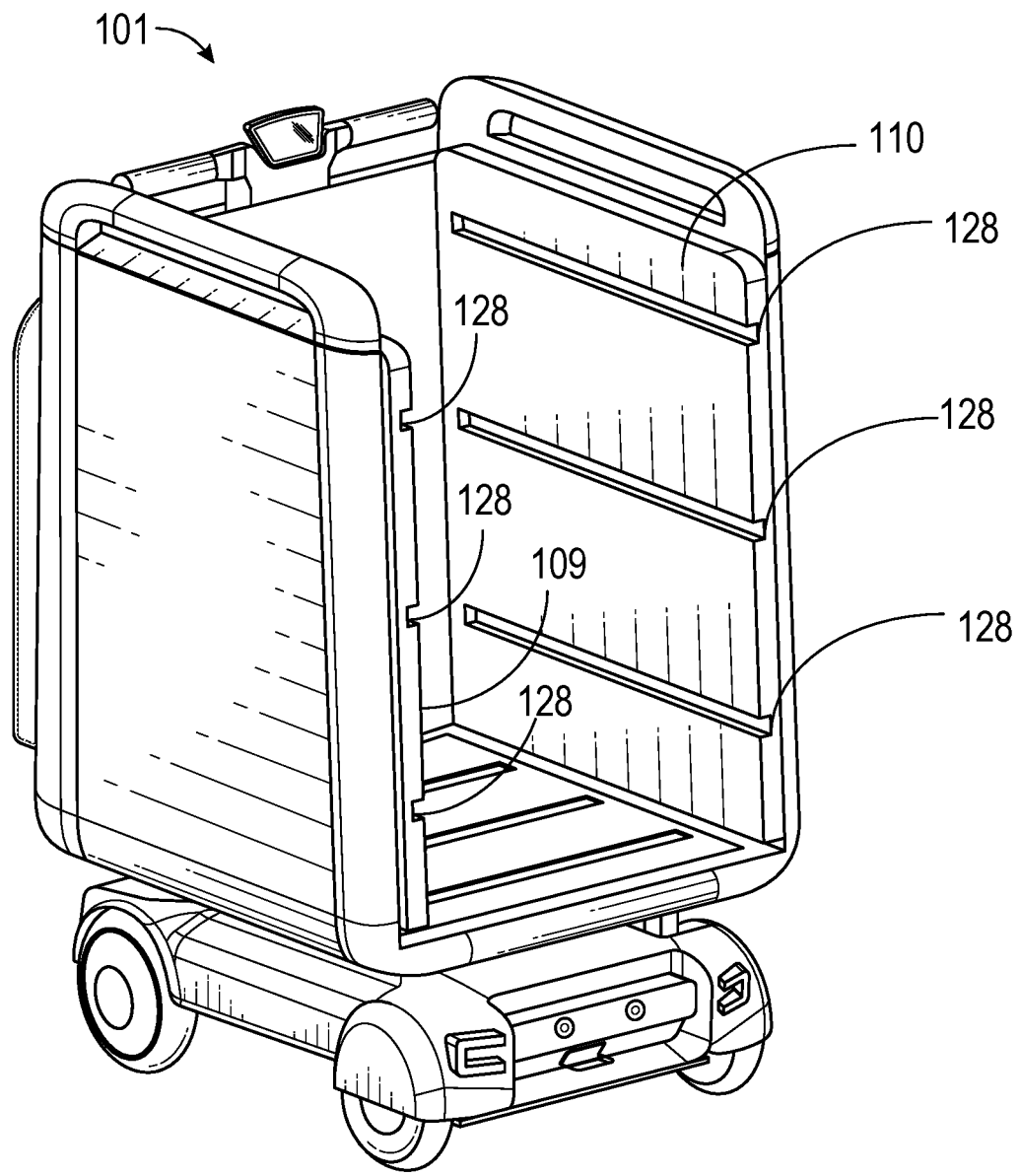
FIG. 11 depicts the telescoping internal frame includes a plurality of slots integrated into the internal frame sidewall panels in accordance with embodiments of the present disclosure.

In some embodiments, the robot 101 may include one or more corresponding pairs of brackets 129 that may also be configured to receive the container 112, rather than integrating the slots 128 directly into the telescoping internal frame sidewall panels 109 and 110 as depicted in FIG. 11 (discussed hereafter). The brackets 129 (and/or the slots 128) can translate vertically in an upward or downward manner along with the telescoping internal frame 115 when actuated by the telescoping internal frame actuator (see, e.g., FIG. 34) to vertically position the container 112, which may allow for selective vertical positioning of the container 112 for pickup, exchange, and/or delivery.

The telescoping internal frame 115 may further include a lateral support member 137 rigidly connecting the left internal frame sidewall panel 109 and the right internal frame sidewall 110 such that the lateral support member 137 provides additional structural support to avoid torsional forces and deforming of the telescoping internal frame 115. Accordingly, when seated in an un-extended position as shown in FIG. 10, the lateral support member 137 may seat in a recessed pocket 123 disposed in the base platform 124. By recessing the lateral support in the base platform 124, the top surface of the base platform 124 remains substantially flat such that the lateral support member 137 does not interfere with items or users.

Although FIGS. 10, 12, 13, 15, 16, and others depict the conveyor mechanisms 131 disposed on respective surfaces of the sidewall panels 109 and 110, it should be appreciated that the conveyor mechanisms 131 may be disposed at the base of sidewall pockets (not shown in FIG. 10) such that the conveyor mechanisms are recessed within the telescoping internal frame sidewall panels 109 and 110 to increase interior sitting room for users of the robot 101 when configured as a human transport device. Moreover, the robot 101 may include the conveyor mechanisms 131 and the brackets 129, as depicted in FIG. 10, alternatively or simultaneously, such that the container 112 can rest on a top surface 119 of opposing conveyor mechanisms 131, inside of opposing receiving brackets 129, or inside of slots as shown in FIG. 11.

The telescoping internal frame 115 can include a left internal frame sidewall panel 109, a right internal frame sidewall 110, and a back internal frame sidewall panel 111. The telescoping internal frame 115 may also include a plurality of conveyor mechanisms 131 disposed on or integrated as part of the telescoping internal frame sidewall panels 109 and 110, and/or a plurality of brackets 129. FIG. 11 depicts such a configuration, where the robot 101 includes a plurality of slots 128 integrated in the sidewall panels 109 and 110 such that the container 112 (not shown in FIGS. 10, 11) may slide laterally toward and away from the back internal frame sidewall panel 111. The conveyor mechanisms 131 may be configured to convey the container(s) 112 laterally for transfer from the robot 101 to another receiving mechanism, which may be a holding platform, a bracket, another robot, a vehicle container storage area, etc.

FIG. 11 depicts another embodiment where the telescoping internal frame 115 includes a plurality of slots 128 integrated into the sidewall panels 109 and 110. In some embodiments, as in FIGS. 14 and 32, one or more containers 112 can be configured to slidably connect with a plurality of slots 128 disposed between conveyor mechanism(s) 131. The robot 101 can include additional or fewer slots that those illustrated. The slots 128 may be disposed on or integrated into respective internal frame sidewall panels 109 and 110. In various embodiments, the robot 101 comprises a mechanism or mechanisms that allow the container 112 to be translated along the slot 128 of the bracket 129, supported by a pair of payload surfaces disposed on opposing sidewall panels of the telescoping internal frame 115. The payload surfaces (e.g., a bottom portion of the slot 128 as shown in FIG. 11, or a top surface of the conveyor mechanism 147 as shown in FIG. 12) are configured to support a payload. For example, with continued attention given to FIG. 11, the slots 128 may be disposed in the internal frame sidewall panels 109 and 110 as opposing pairs, or could (alternatively) include wheels or a conveyor track (as shown in FIG. 12) that engage with the container ears 132 (see FIG. 12, for example), or other portions of the container 112, to translate the container 112 from the payload surfaces into a container support and translation member.

A container support and translation member may include, for example, a slot or conveyor mechanism of another robot, a compartment, or other receptacle of a delivery vehicle. A slot having wheels or conveyor tracks for receiving and/or translating a container in accordance with the present disclosure is referred to generally as a container support and translation member, an example of which is described in greater detail in FIG. 12, among other figures.

FIG. 12 illustrates the robot 101 with the container 112 disposed on top surface(s) 147 of two opposing conveyor mechanisms 131 by way of two container ears 132 disposed on opposite sides of the container 112, such that the container 112 can hang freely using the container ears 132, and be conveyed forward and backward via the moving top surface of the conveyor mechanism(s) 147 with respect to the back internal frame sidewall panel 111. For example, the control system 107 may issue a command to the conveyor mechanism(s) 131 to convey the container 112 forward or backward responsive to determining that the receiving container support and translation member or other receptacle (not shown in FIG. 12) is positioned to be aligned with the two container ears 132.

Although the container 112 is depicted as a deep container taking most or all of the capacity in the telescoping internal frame 115, it should be appreciated that containers may take various shapes and sizes that are configured according to particular uses. FIG. 13 depicts the robot 101 having three containers 112A, 112B, and 112C disposed on opposing pairs of conveyor mechanisms 131. The container 112A is shown having two hinged lid members 213 disposed on a top portion of the container 112A such that the hinged lid members 213 may open at a center of the top portion of the container 112A. Other configurations are possible, and contemplated.

Figure 14:
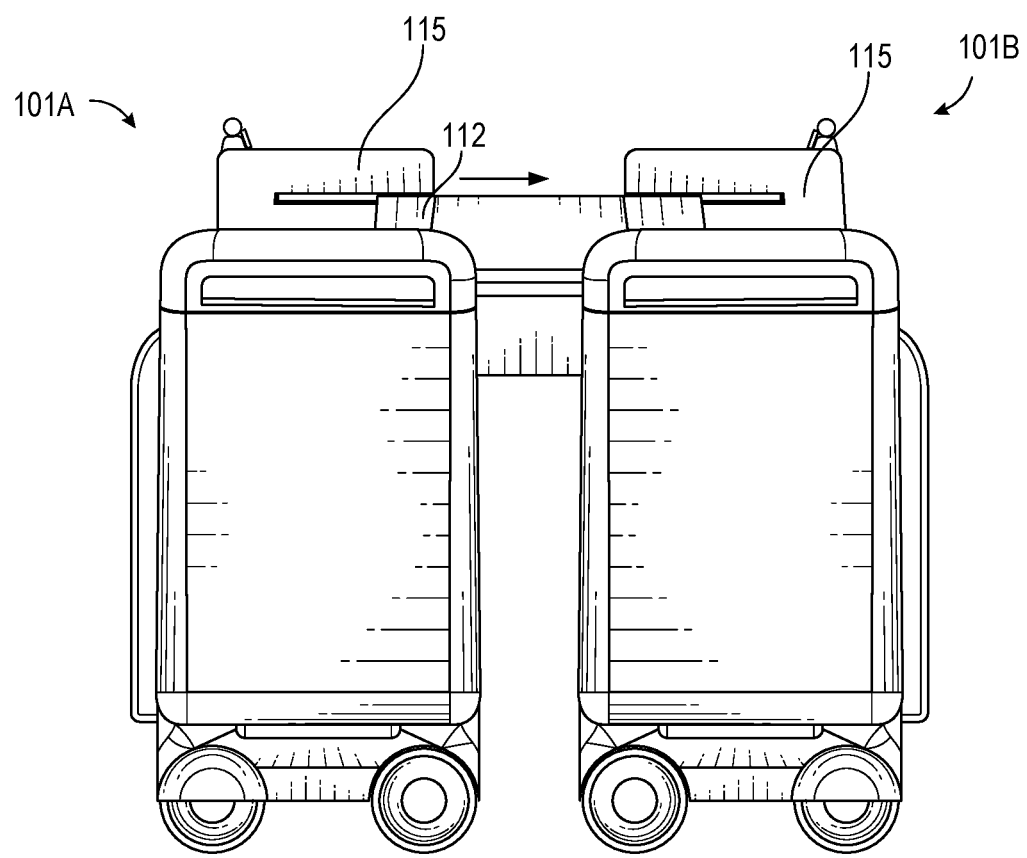
FIG. 14 depicts transferring a container from a first robot to a second robot in accordance with embodiments of the present disclosure.

FIG. 14 depicts two robots 101A and 101B transferring a container 112 from a first robot 101A to a second robot 101B. The conveyor mechanisms 131 may be configured such that any one or more containers 112 may be conveyed away from the back internal frame sidewall panel 111 toward a receiving mechanism (not shown in FIG. 14). The first robot 101A may actuate the conveyor mechanisms (not shown in FIG. 14) upon which the container ears 132 (not shown in FIG. 14) are seated, such that the conveyor mechanisms can transfer the container(s) 112 to the receiving mechanisms (not shown in FIG. 14) disposed on the second robot 101B. The second robot 101B and/or the first robot 101A may adjust the height of the telescoping internal frame (not shown in FIG. 14) such that the slots, grooves, and/or conveyor mechanisms are aligned so that the container ears 132 may support the weight of the container 112 being transferred using the respective support member of the second robot (not shown in FIG. 14).

Figure 15:
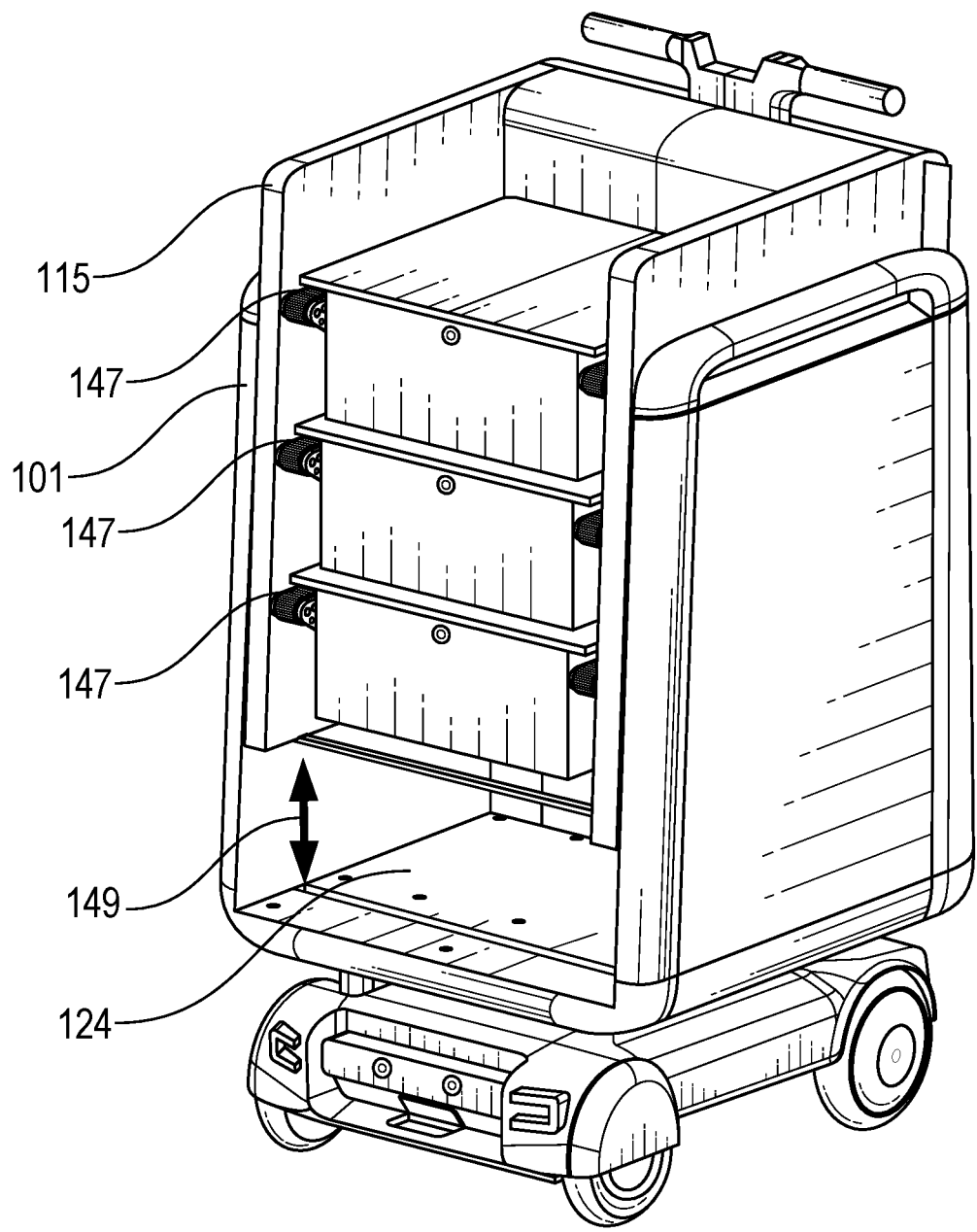
FIG. 15 depicts the robot adjusting a vertical position of the telescoping internal frame such that the telescoping internal frame is moved vertically with respect to the base platform in accordance with embodiments of the present disclosure.
Figure 21A:
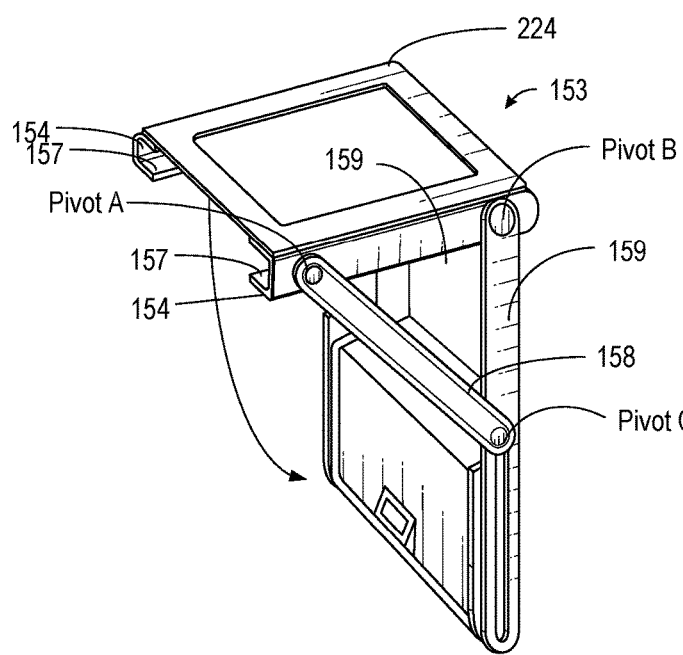
FIGS. 21A and 21B depict a smart door receiver in accordance with embodiments of the present disclosure.
Figure 21B:
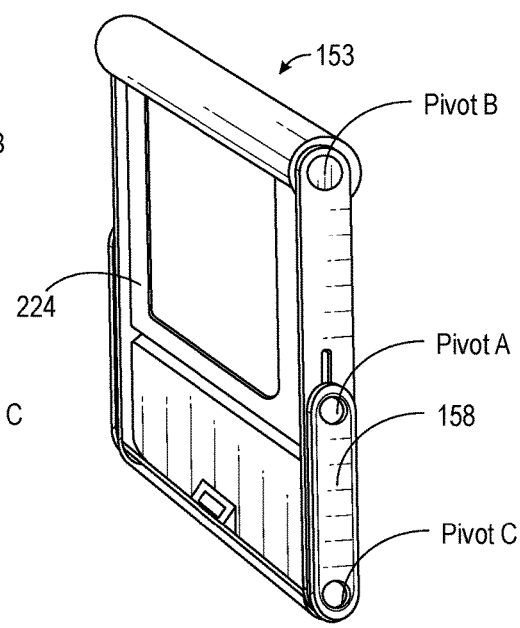

FIG. 15 depicts the robot 101 adjusting a vertical position 149 of the telescoping internal frame 115 such that the telescoping internal frame 115 is moved vertically with respect to the base platform 124. The telescoping internal frame 115 may extend to an infinite number of positions within the limits of the height of the telescoping internal frame 115. In FIG. 15, the telescoping internal frame 115 is moved upwardly to allow for receipt or placement of the container 112 with a corresponding receiving or storage mechanism in a mobile warehouse, delivery vehicle (shown in later FIGS.) or other similar apparatus. The robot 101 is illustrated in FIG. 14 exchanging the container 112 with another similarly configured robot. The robot 101 may determine that the container 112 is generally aligned with the receptacle grooves (e.g., the receptacle grooves 154 as shown in FIGS. 21A-21B). Responsive to determining that the container 112 is aligned, the robot 101 may proceed forward to place the container 112 in the receptacle device (e.g., by engaging the container ears 132 into the receptacle grooves 154. In some embodiments, the robot 101 may engage the conveyor mechanisms 131 (not shown in FIG. 15) to convey the container 112 forward until placed securely in the smart door receiver 153 (as shown in FIGS. 21A-21B).

Figure 16:
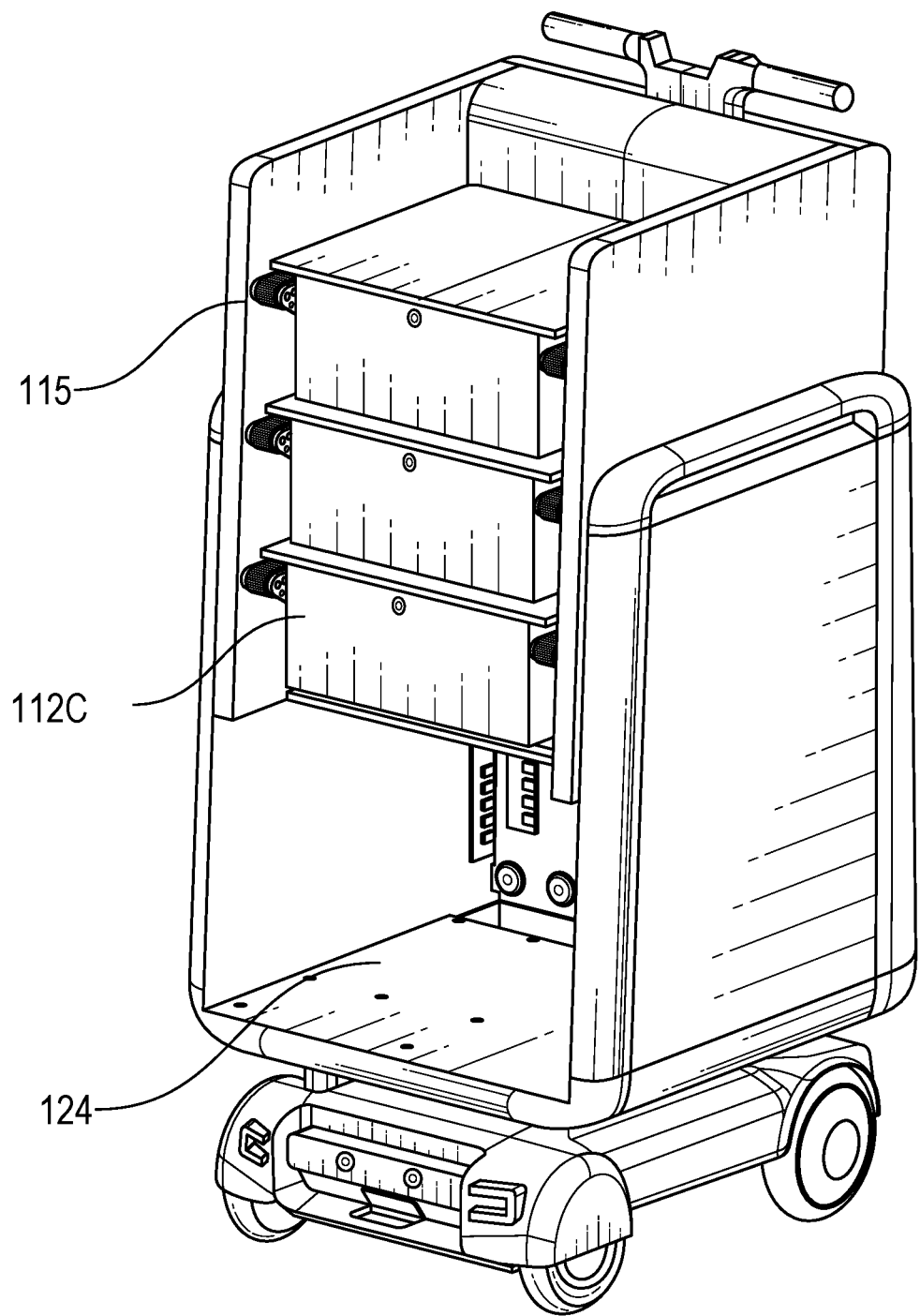
FIG. 16 depicts another view of the telescoping internal frame, extended well above the base platform in accordance with embodiments of the present disclosure.

FIG. 16 depicts another view of the telescoping internal frame 115, extended well above the base platform 124. In one embodiment, the telescoping internal frame 115 may extend vertically such that the bottom-most container 112C may align with set of top conveyor mechanisms (not shown in FIG. 16) of another robot.

Figure 17:
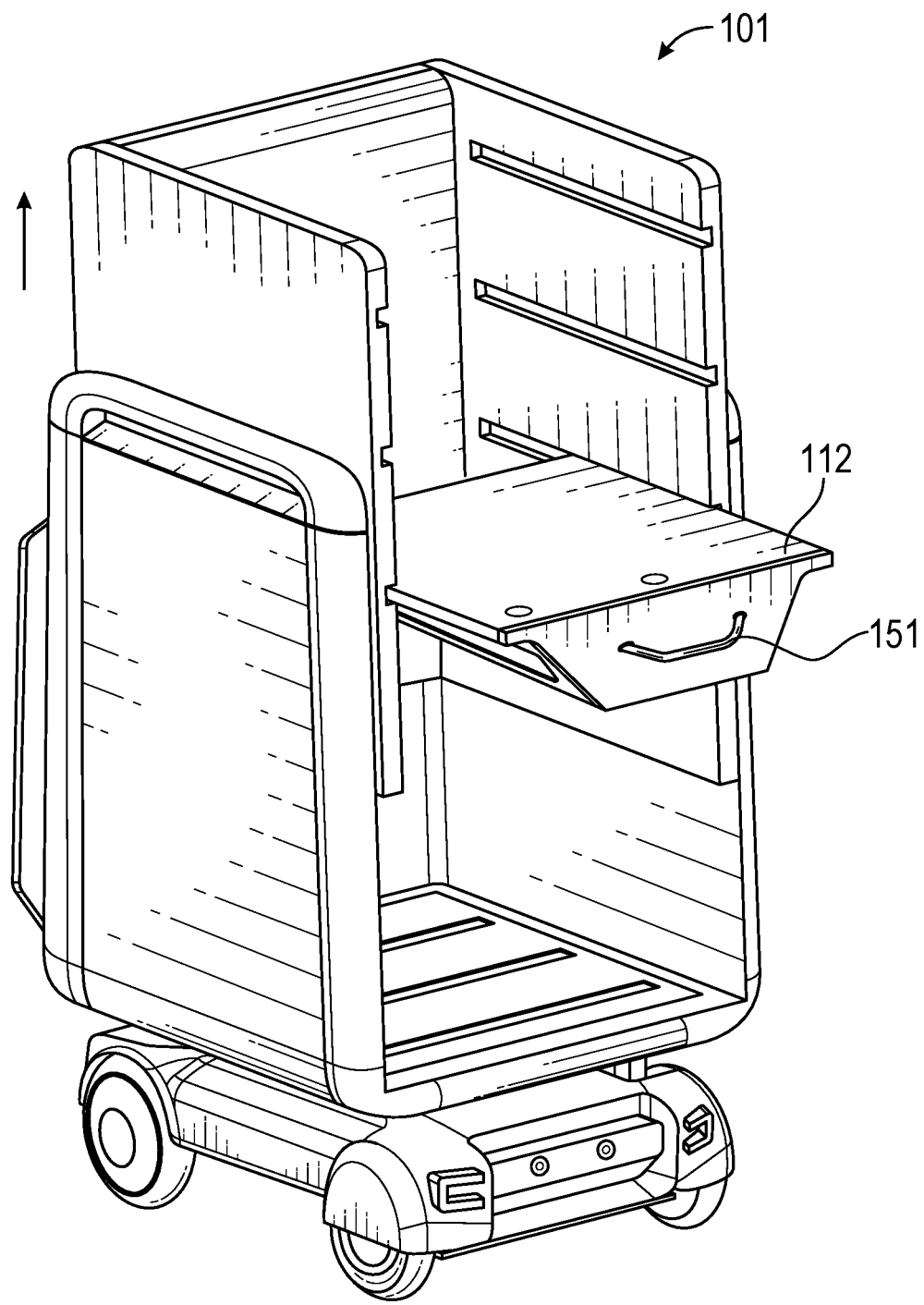
FIG. 17 depicts an embodiment where vertical translation of the telescoping internal frame is implemented in accordance with embodiments of the present disclosure.

In other embodiments such as the embodiment depicted in FIG. 17, which illustrates another example where vertical translation of the telescoping internal frame 115 is implemented. In the present example of FIG. 16, the container 112 may be configured as a replaceable storage drawer having a pull-handle (as shown in FIG. 17), such that the container 112 may be conveyed from the robot 101 to a receptacle in a warehouse truck (not shown in FIG. 17), a medical tool rack (not shown in FIG. 17), or another similar receptacle.

Figure 18:
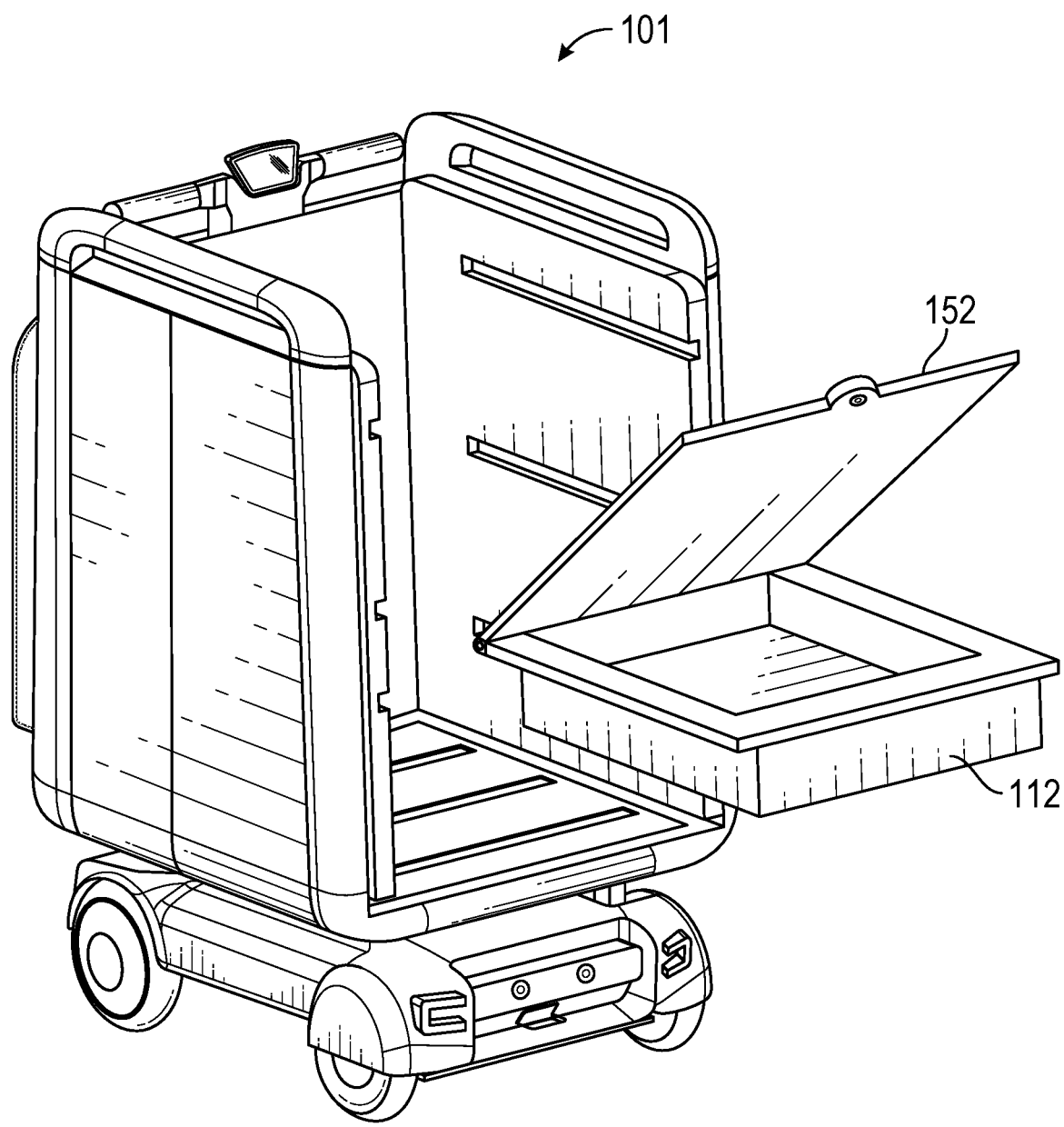
FIG. 18 is another embodiment depicting the container, where the container includes a rear-hinged lid in accordance with embodiments of the present disclosure.

FIG. 18 is another embodiment depicting the container 112, where the container includes a rear-hinged lid 152. The purpose of the present embodiment is to depict another of the various use cases in which the container 112 may be configured to include lids hinged to serve multiple purposes.

Figure 19:
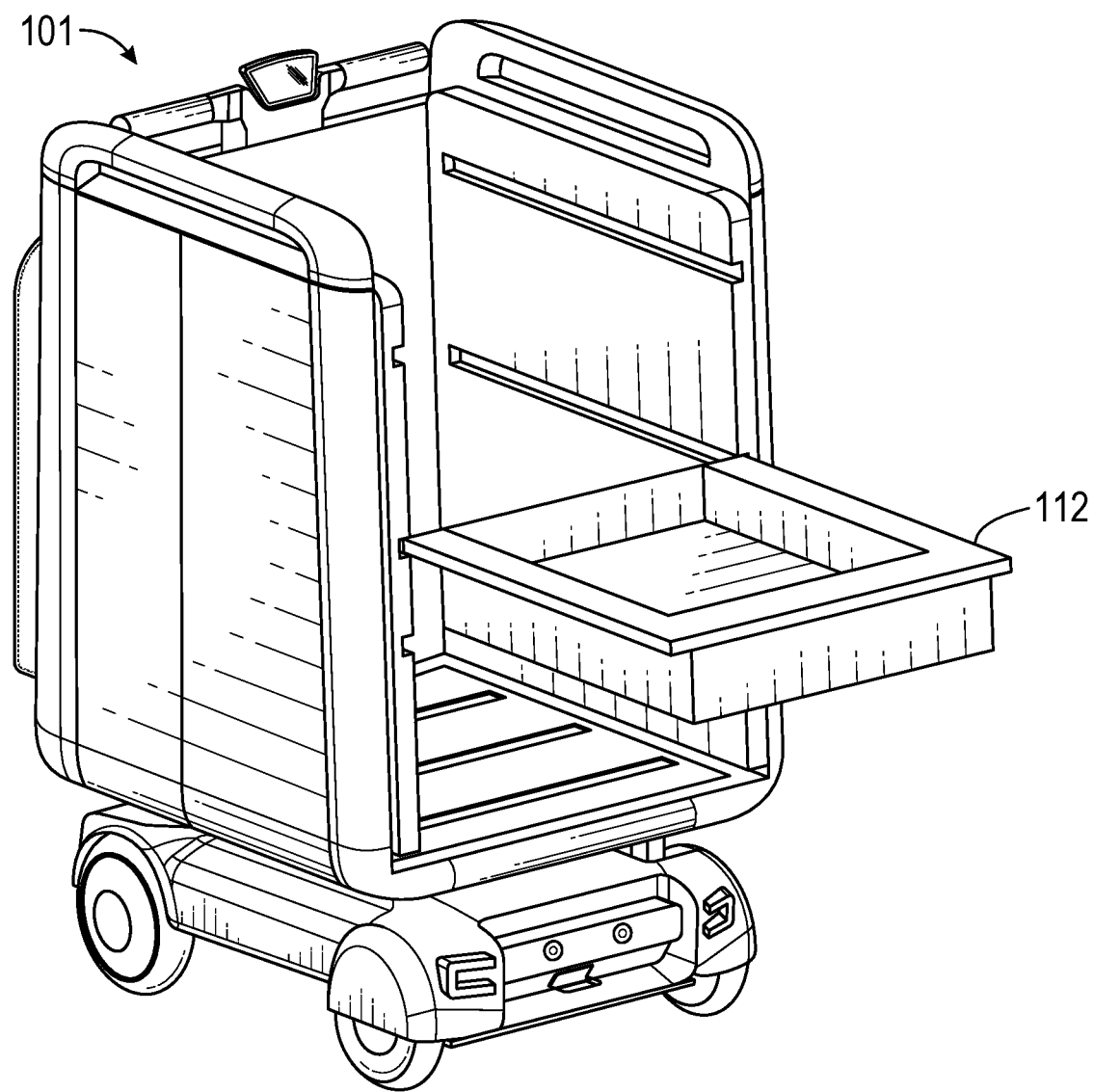
FIG. 19 illustrates an embodiment where the container is a storage bin having no lid in accordance with embodiments of the present disclosure.

FIG. 19 illustrates yet another example, where the container 112 is a storage bin having no lid. With a lidless storage bin as shown in FIG. 19, the robot 101 may deliver parts or materials needed for easy access. The container 112 may slide into receptacle slots (not shown in FIG. 19), of the receiving conveyor mechanism, or may fit on a foldable container rack, as shown in following figures.

Figure 20A:
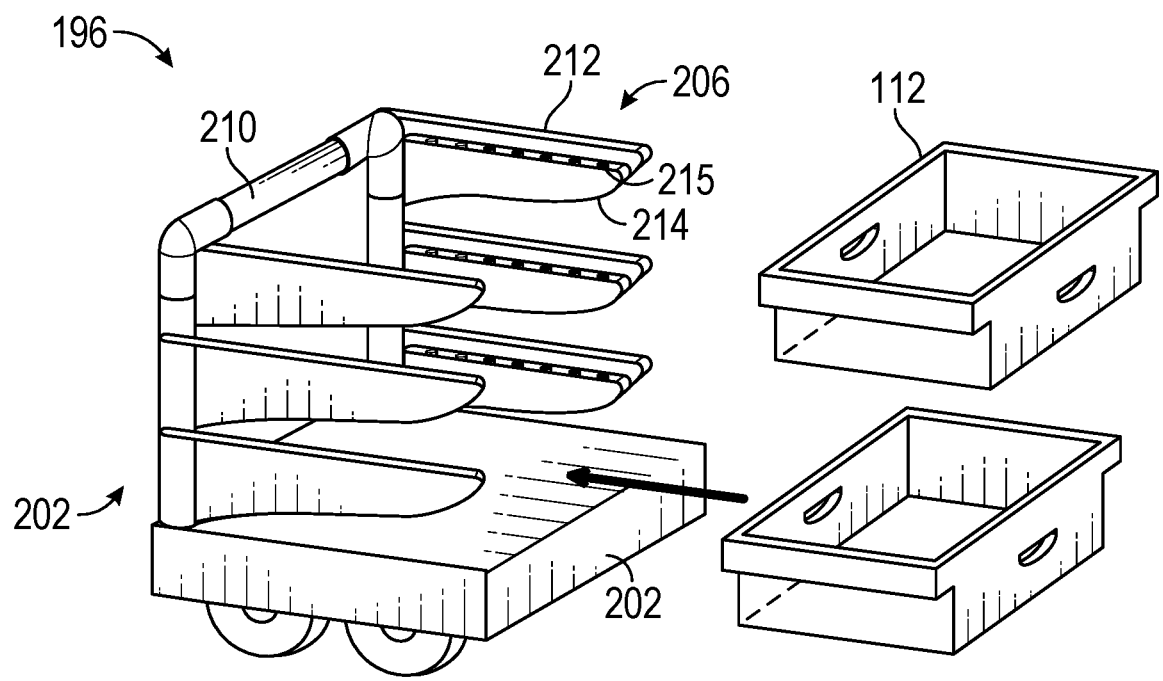
FIG. 20A depicts an example container support and translation and support robot, which may provide mobile container support in accordance with embodiments of the present disclosure.

FIG. 20A depicts an example container support and translation robot 196, which may provide mobile container support for one or more containers (e.g., the container(s) 112 depicted in prior FIGS.), in accordance with embodiments. The container and support robot 196 may include a control bar (not shown in FIG. 20A) disposed at a rear portion 202 of the of the robot 196, which may provide for manual operation of the robot 196 similar to the steering mechanism 114 of the robot 101 depicted with respect to FIG. 2 (among other FIGS.). The container support and translation robot 196 may further include a plurality of lateral side structures 206, respectively including an arm segment 212.

Figure 20B:
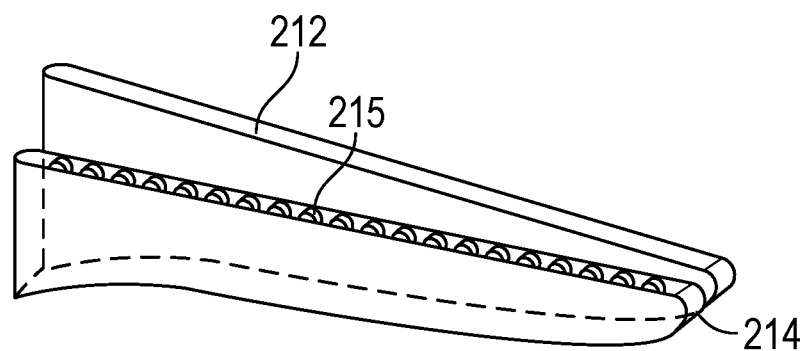
FIG. 20B shows an exploded view of an example container support and translation member in accordance with embodiments of the present disclosure.

The arm segments 212 may include a container support and translation member 214. A closer view of an example container support and translation member 214 is found in FIG. 20B. The container support and translation member 214 can include a plurality of rotational conveying mechanisms, such as one or more rollers 215 that allow for free sliding or actuated translation of the container 112. The container support and translation member 214 can further include motorized rollers or belts to load/unload packages/containers.

FIGS. 21A and 21B depict a smart door receiver 153. The smart door receiver 153 may include receptacle grooves 154 disposed on an underside of a bin supporting member 224 that include payload surfaces which are configured to support a payload, such as a container 112 as shown in prior figures. The bin supporting member 224 may include an opening (shown) or a hinged door (not shown in FIGS. 21A and 21B) such that a lidless container (as shown in FIGS. 19 and 20A) may be easily accessed. The bin supporting member 224 may be attached via hinges to a set of vertical support arms 159 at a pivot B, which may be disposed on opposite sides of the bin supporting member 224. The smart door receiver 153 may further include one or more folding arms 158 disposed on one or more sides of the bin supporting member 224 that are attached via hinges to the bin supporting member 224 at a pivot A and movably disposed to the vertical support arms 159 at a sliding pivot C such that the bin supporting member 224 may lock into position in an open position (as shown in FIG. 21A) or closed position (as shown in FIG. 21B), respectively.

Figure 22A:
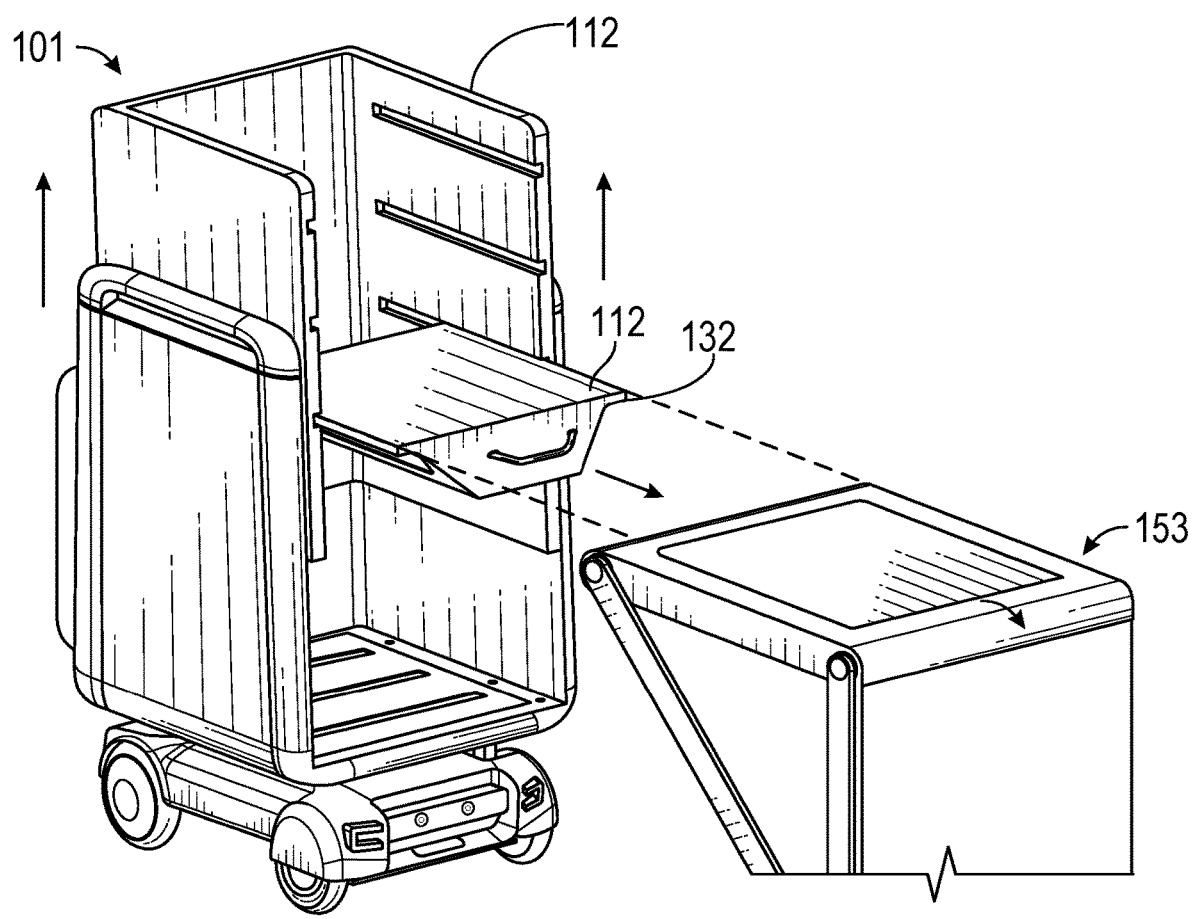
FIGS. 22A and 22B illustrate the robot delivering a container to the smart door receiver in accordance with embodiments of the present disclosure.
Figure 22B:
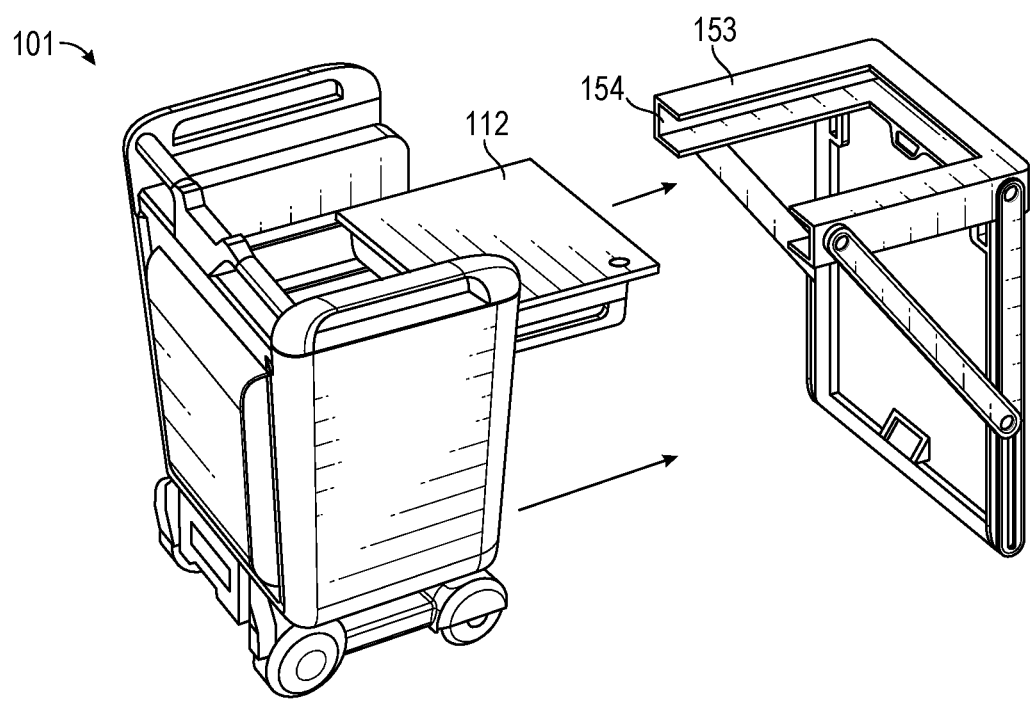

FIGS. 22A and 22B collectively illustrate the robot 101 delivering a container 112 to the smart door receiver 153. Various iterations of the smart door receiver 153 are illustrated in these figures as well. The robot 101 can vertically translate the telescoping internal frame 115 to position the container 112 for association with the receptacle grooves 154 as illustrated in FIG. 22A. FIGS. 22A and 22B depict an example smart door receiver 153 in a closed position (FIG. 22A) and an open position (FIG. 22B), respectively. The smart door receiver 153 may be utilized in a mobile warehouse (not shown in FIGS. 22A and 22B) or in another location where there is ready access to goods stored in a bin (not shown in FIGS. 22A and 22B). An example bin which is storable in the smart door receiver 153 can include, for example, the container 112 depicted with respect to FIG. 19. Other bins may also be stored in the smart door receiver 153.

FIG. 22B depicts the robot 101 aligned to transfer a container 112 to the smart door receiver 153 while it is in an open position. In an example embodiment, the robot 101 may align the container 112 with the receptacle grooves (not shown in FIGS. 22A-22B) by triggering a telescoping internal frame adjustment mechanism (not shown in FIGS. 22A-22B) to move the telescoping internal frame 115 vertically until the container ears 132 are aligned with the receptacle grooves of the smart door receiver 153.

Figure 23:
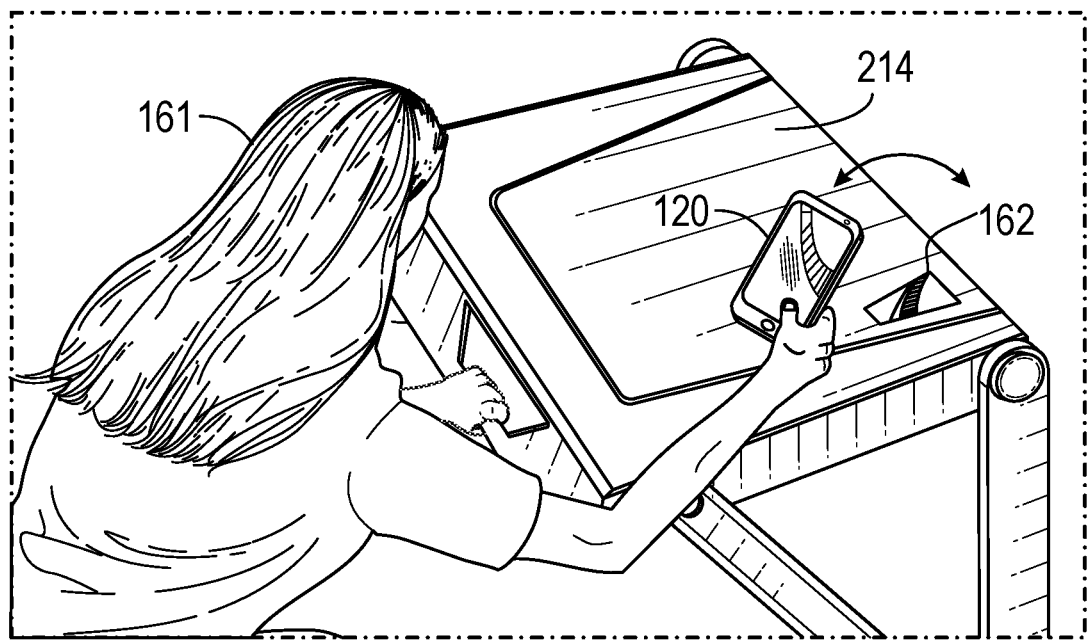
FIG. 23 illustrates a user interacting with the robot using a smart device, in accordance with embodiments of the present disclosure.

In some embodiments, a customer may slide out or open a container by using a preassigned code or a smart phone application. That is, the robot 101 (or more specifically the control system 107) can be configured to release containers 112 based on receiving a code or through user request mediated through a smart phone application used to control the robot 101. In some embodiments, a top or bottom of the container 112 may open to drop the package at a target location. FIG. 23 depicts a user 161 scanning an RFID tag 162 or other smart identification device using a mobile device 120 or other RFID reader. The RFID tag 162 may be disposed on the container 112 to assist in identifying contents stored within the container 112.

The mobile device 120 can be used to identify and authenticate the user with the robot 101 or allow the robot 101 to identify which package belongs to the user. The user can remove any container for which the user has been authenticated. That is, once the robot identifies which container(s) the user can access, the robot 101 can unlock the container to allow either the container or the contents of the container to be removed.

In some embodiments, the control system 107 can authenticate a user based on a biometric sensor (or bio sensor) integrated into the wireless and wireless control unit 146. For example, the user can place their finger on a biometric sensor, when integrated with the control system 107 which can authenticate their fingerprint to allow access to use the robot 101 as a transportation device. In other embodiments, the user's fingerprint can be authenticated by the control system 107 to allow the user 140 to remove (or access contents within) a container that has been associated with the fingerprint of the user. When fingerprint identification has been disclosed, any one or more suitable authentication methods can be used such as passwords, device authentication (authentication of user device such as smartphone), and so forth.

In FIGS. 24 and 25, the robot 101 is depicted in various human transport modes, where a user 140 can sit in/stand on the robot 101 and be transported by another user/operator 140A that can control the robot 101 as the other individual (e.g. caregiver) walks behind the robot (as shown in FIG. 24) or as the user 140 operates the robot 101 while riding in the robot (as shown in FIG. 25) using a wireless control unit 146. The wireless control unit 146 may be removably disposed on a control unit cradle 163 rigidly attached onto or integral to the steering mechanism 114. By removably attaching the wireless control unit 146 to the steering mechanism 114 (or another accessible portion of the robot) the controlling individual (one of the users 140 or 140) may control the robot 101 with easy access to the wireless control unit 146.

The wireless control unit 146 may include one or more control interfaces (not shown in FIG. 24 or 25) that may be disposed in wired or wireless communication with the control system 107 to receive notifications and provide control commands such as steering commands and conveyance commands (e.g., forward, left, right, start, stop, speed control, etc.), control of the telescoping internal frame 115 (e.g., up, down, hold, etc.) and other commands.

FIG. 25 illustrates the user 140 independently utilizing the robot 101 in a wheelchair configuration. In this embodiment, the user is utilizing a detachable and wireless control unit 146. The detachable and wireless control unit 146 can be used to steer or otherwise control aspects of the robot 101. In other embodiments, the robot 101 can include a joystick (not shown in FIG. 25)), or another control mechanism embedded in one of the telescoping internal frame sidewall panels 109 and 110. The joystick can be folded down for use. In general, the detachable and wireless control unit 146 is a touchscreen control unit that comprises a processor and memory. The memory stores instructions that can be executed by the processor to control aspects of robot 101 operations, with respect to both autonomous control and/or user-directed control. In some embodiments (see FIG. 29) the robot 101 can include a robot controller that is used to control aspects of robot operations.

Figure 26:
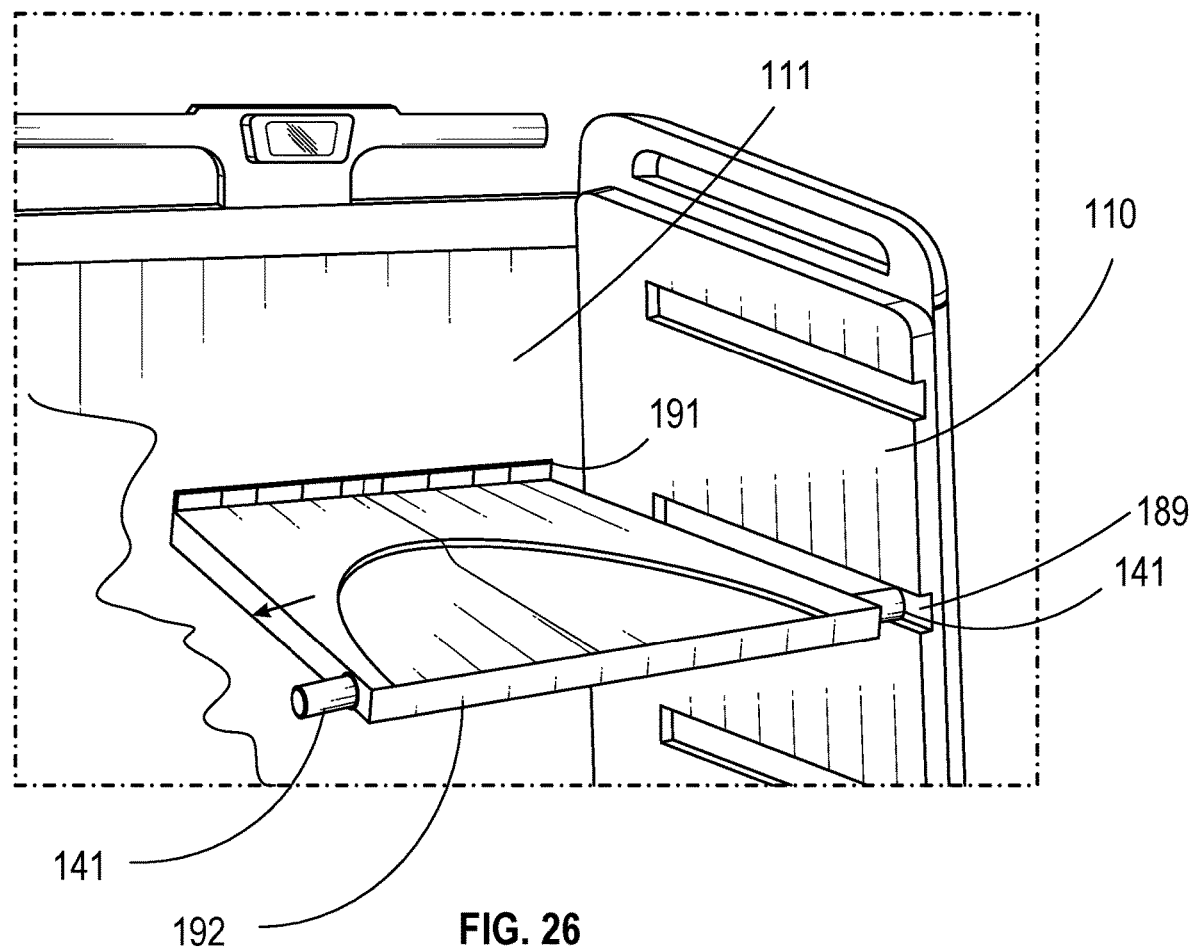
FIG. 26 illustrates a foldable seat for use while the robot is in a wheelchair mode in accordance with embodiments of the present disclosure.

In FIG. 26, a foldable seat 192 is illustrated. A user may sit upon the foldable seat 192 when the seat is installed on the telescoping internal frame 115. The foldable seat 192 can be attached via hinges to the left internal frame sidewall (not shown in FIG. 26) and right internal frame sidewall 110. A rear portion of the foldable seat 192 may rest upon a ledge 191 in the back internal frame sidewall panel 111 such that the ledge 191 can support the weight of a user seated on the foldable seat 192. Pins 189 may extend laterally to engage with conveyor mechanism(s) 131 in the internal frame sidewall panels 109, 110 (only 110 seen in this view). The pins 189 may retract or are otherwise stored when the foldable seat 192 is in a stored configuration (folded against the back internal frame sidewall panel 111). In another embodiment, the pins 189 may retract into the foldable seat 192, or may be integrated as non-moving members of the foldable seat 192 that do not retract. When the foldable seat 192 is deployed (folded down to be substantially perpendicular or cantilevered relative to the internal frame sidewall panels 109, 110, and 111), the pins 189 deploy and engage with the slots 128 in the telescoping internal frame sidewall panels 109 and 110. In another embodiment, rather than (or in addition to) using the pins 189, the securement members can include pivoting and locking linkages (not shown in FIG. 26). The foldable seat 192 can be moved manually or automatically in some embodiments through use of at least one motor-driven actuator(s) (not shown in FIG. 26).

Figure 27:
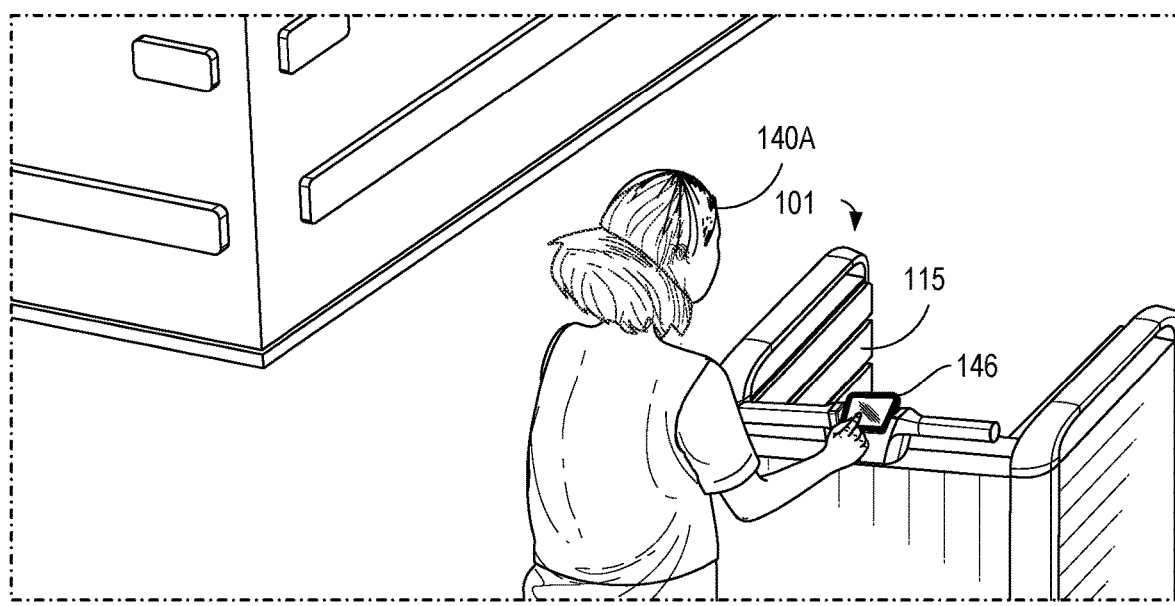
FIG. 27 depicts the user interacting with the wireless control unit to control an operation of the telescoping internal frame in accordance with embodiments of the present disclosure.

In FIG. 27, the user 140A is interacting with the wireless control unit 146 to control an operation of the telescoping internal frame 115 via the wireless control unit 146. The wireless control unit 146 may provide the user interface (not shown in FIG. 27) to raise or lower the foldable seat 192 to accommodate a rider (shown in FIG. 25).

Figure 28:
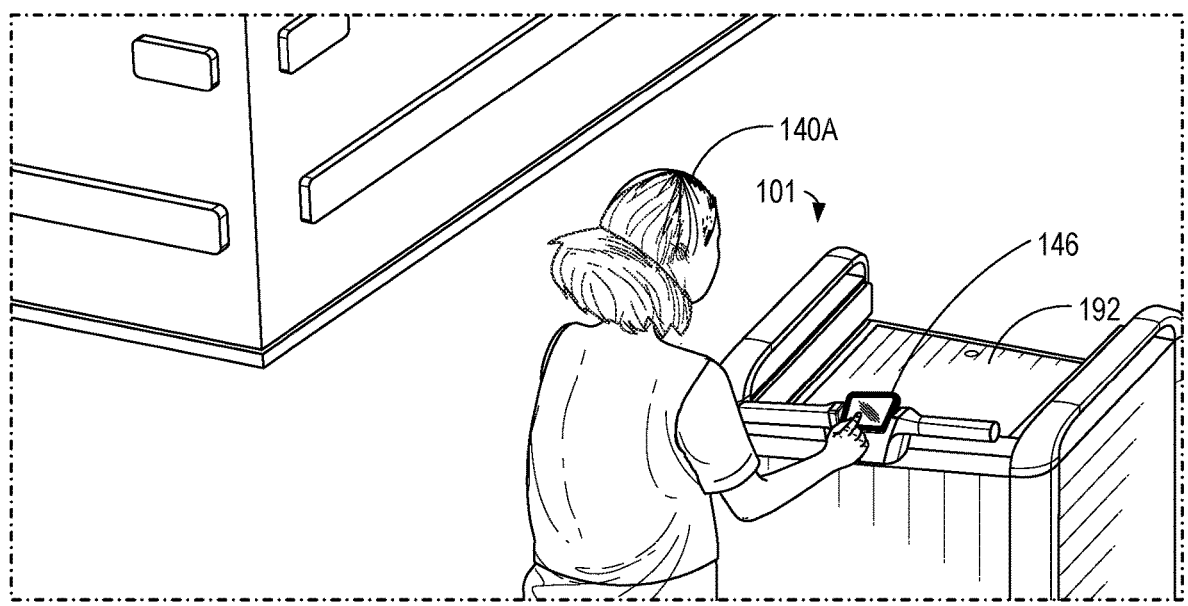
FIG. 28 depicts the user controlling the wireless control unit to raise the foldable seat to its highest position in accordance with embodiments of the present disclosure.

FIG. 28 depicts the user 140A controlling the wireless control unit 146 to raise the foldable seat 192 to its highest position. FIG. 28 is included to illustrate one possible functionality of the robot 101. In one aspect, the robot 101 may function to lift or lower a patient in a hospital or other setting such that the patient (not shown in FIG. 28) may be assisted to sit, stand, etc.

In FIG. 29, the user/operator (user 140A) has controlled the robot 101 to lower the seated patient (e.g., the user 140B) to a desired height. It should be appreciated that the robot 101 may be controllable to raise or lower the user 140B to any seated height using the telescoping internal frame 115.

FIG. 30 illustrates a user 140B seated in the robot 101 while utilizing the robot 101 as a personal transport vehicle. In other aspects, the user 140B may control the robot 101 for personal transport while seated in the robot 101. Using the wireless control unit (not shown in FIG. 30.). FIG. 30 is provided as an example where the robot 101 is utilized for yet another purpose: as a personal transport vehicle.

Figure 31:
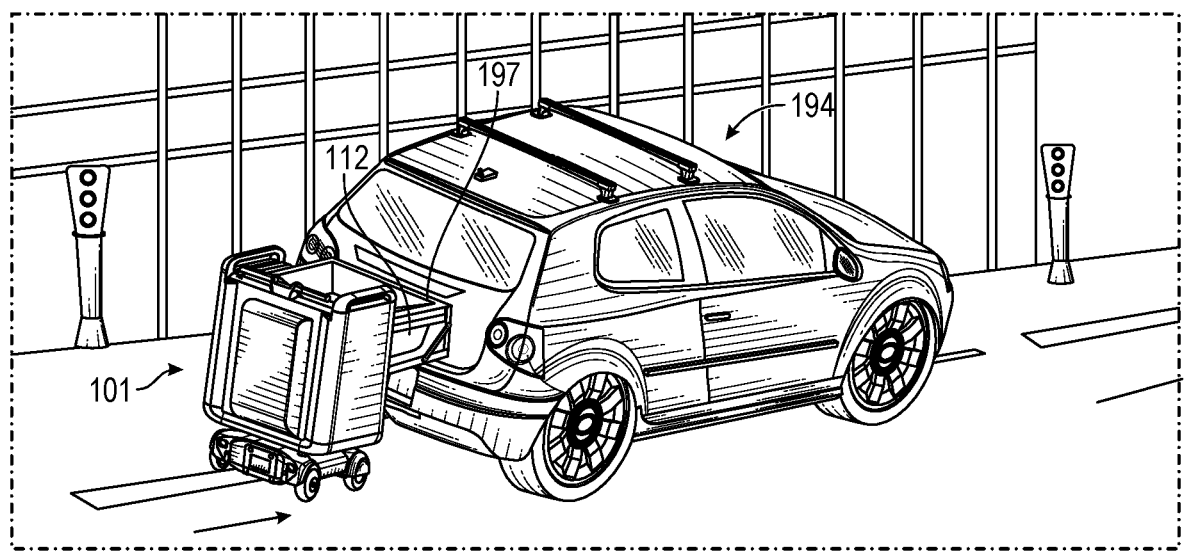
FIG. 31 depicts the robot delivering a container into a delivery vehicle in accordance with embodiments of the present disclosure.

One of the many advantages of the multi-use mobile robot is the versatility of transferring passengers (such as the user 140B as shown in FIGS. 29-30), or delivering packages. FIG. 31 depicts the robot 101 delivering a container 112 into a delivery vehicle 194. In one embodiment, the delivery vehicle 194 includes a container receptacle 197 configured to receive the container 112 from a delivery robot such as the multi-use robot 101. The delivery vehicle 194 may be configured to receive containers and deliver the containers to other locations.

FIG. 32 depicts the robot 101 loading a container 112 into another delivery vehicle 198. The robot 101 may raise or lower the telescoping internal frame 115 to accommodate various heights of receptacles, such as shown in FIG. 32. In some aspects, the delivery vehicle 198 may include one or more autonomous delivery drones 199 that may deliver content of the container(s) 112 to a final destination.

As noted throughout, the robot 101 is capable of operating in an autonomous manner. Thus, while a user can program container and/or human transport using the wireless and the wireless control unit 146, the control system 107 may also be configured to operate autonomously through navigation guidance and commands provided by an orchestration service 201, which may be cloud-based and operative on the server(s) 170, or local to a delivery vehicle such as the delivery vehicle 198. In some embodiments, the control system 107 can communicate with the orchestration service 201 over the network(s) 125. In some embodiments, the orchestration service 201 can include a vehicle controller 203 of the mobile warehouse (as shown in FIG. 33).

Figure 33:
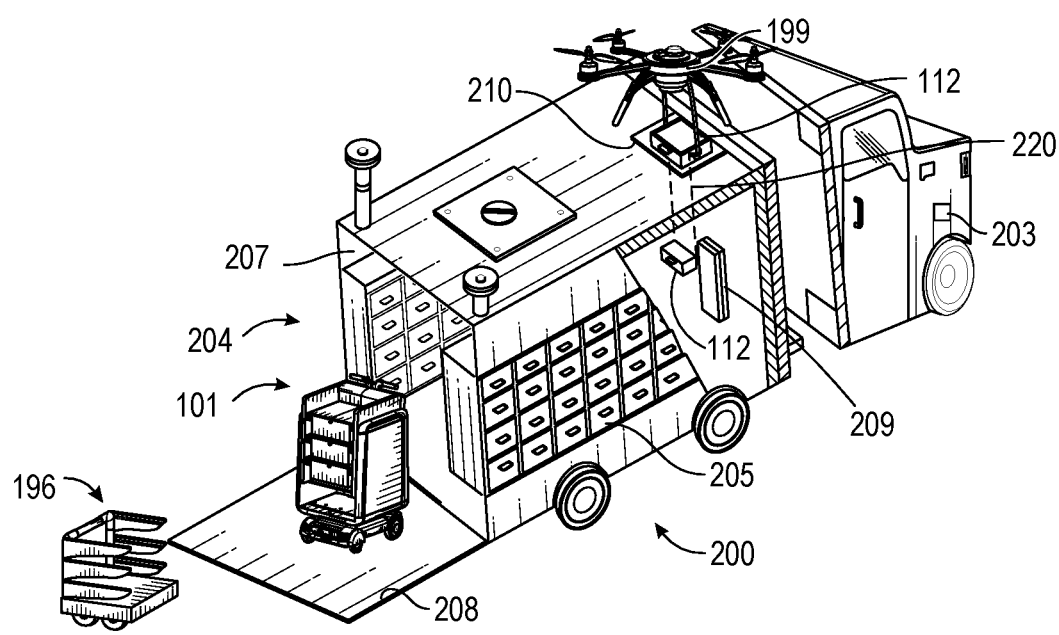
FIG. 33 illustrates an example mobile warehouse, according to embodiments of the present disclosure.

FIG. 33 illustrates an example mobile warehouse 200, according to embodiments of the present disclosure. In one aspect, the mobile warehouse may be an autonomous, semi-autonomous, or conventionally-driven vehicle used to warehouse containers (e.g., the container 112 and others), and transport goods and supplies to on-site locations, where an autonomous delivery drone 199, robot 101, and/or container and support robot 196 may coordinate delivery of goods to final destinations.

The mobile warehouse 200 may include a storage area 204 having a plurality of accessible containers organized in racks 205. Robots 101, 196, etc., may enter and exit the storage area 204 via a rear opening 207 that can include an adjustable ramp portion 208 that may accommodate various heights that allow the robots 196, 101, etc., access to the storage area 204.

The mobile warehouse 200 may further include a robot battery recharging and dispensing rack 209 upon which a plurality of batteries may be stored, recharged and exchanged with depleted batteries onboard the robot(s) 196, 101.

The mobile warehouse 200 may further include an access hatch 210 through which the autonomous delivery drone 199 may retrieve containers, goods, packages, and other items using a lowerable pulley system 220 configured to attach to desired items such as the container 112 as shown in FIG. 33, retract the pulley system to raise the item(s) out of the delivery vehicle where they can be accessed for transport by the autonomous delivery drone, and transported to a final destination.

Figure 34:
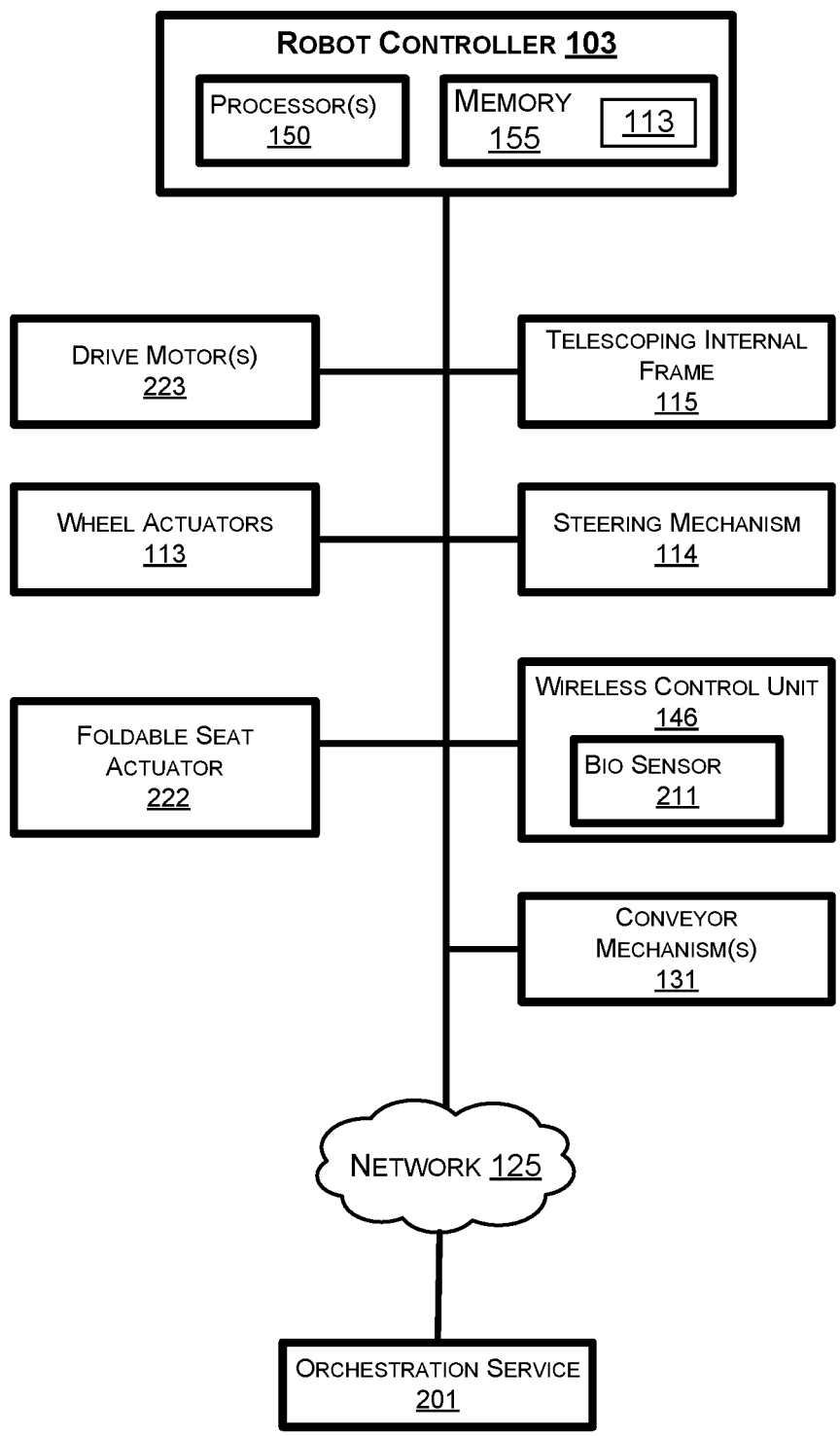
FIG. 34 depicts a functional schematic of a control system in accordance with embodiments of the present controller according to embodiments of the present disclosure.

FIG. 34 depicts a functional schematic of a control system 107 in accordance with embodiments of the present disclosure. The control system 107 can control movement of a robot, such as, for example, the robots 101 and/or 196, according to input that is received from either the steering mechanism 114, the wireless control unit 146, and/or the orchestration service 201. For example, the robot controller 103 may be disposed in communication with one or more drive motor(s) such as, for example, the wheel actuators 113 as shown in FIG. 2, a foldable seat actuator 222, the telescoping internal frame 115, the steering mechanism 114, the wireless control unit 146, and/or the conveyor mechanism(s) 131, among other devices.

In some embodiments, the robot controller 103 can automatically deploy the foldable seat 192 using a foldable seat actuator 222. For example, the foldable seat actuator 222 may be disposed in communication with a piston (not shown in FIG. 34) that is actuated by the robot controller 103 based on a seat fold-down command received through the wireless control unit 146. For example, the foldable seat actuator 222 may receive a fold or unfold command from the robot controller 103, and actuate one or more pistons or other means for actuation to deploy the foldable seat (not shown in FIG. 34) such that a human user may sit on the foldable seat 192.

In general, the robot controller 103 can be configured to implement any of the robot operations disclosed herein through the various components disclosed, either autonomously, or via commands received from the orchestration service 201, which may connect with the control system 107 via the network(s) 125.

The actuators, motors, or other mechanisms that are used to create movements of robot components are not intended to be limiting and are provided only as examples. Advantageously, the multi-use mobile robots disclosed herein provide reduced complexity as the mobile robot can be configured to load and unload its own containers. Thus, no need exists for a separate loading robot in a mobile warehouse. The mobile robots disclosed herein may also provide improved asset utilization and improved response times because of dual use. In yet another advantage, the mobile robots disclosed herein may reduce congestion in urban areas due to a reduced need for a larger number of asynchronous mobile robots. The mobile robots disclosed herein also comprise a flexible design which allows for handling a wide range of package sizes.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or That which is claimed is:

1. A multi-use mobile robot comprising:
   one or more wheels mechanically drivable by a wheel actuator to drive the multi-use robot;
   a base platform comprising a telescoping internal frame configured to support a passenger in a first configuration and carry cargo in a second configuration; and
   a robot controller comprising a memory for storing executable instructions, the robot controller configured to execute the executable instructions to:
      transport the passenger in the first configuration; and
      transport the cargo disposed on a cargo surface of the telescoping internal frame in the second configuration, wherein the cargo comprises protrusions disposed on opposing sides of the cargo, and wherein the protrusions are configured to be supported by a pair of payload surfaces disposed on opposing sidewall panels of the internal telescoping frame;
   a conveyor mechanism disposed on a sidewall panel of the opposing sidewall panels,
   wherein the robot controller is further configured to execute the executable instructions to:
   actuate the conveyor mechanism;
   rotate the conveyor mechanism; and
   convey the cargo along the pair of payload surfaces such that the cargo changes position with respect to a back internal frame wall of the telescoping internal frame.

2. The multi-use mobile robot according to claim 1, further comprising:
   an internal frame actuator rigidly disposed on a surface of the base platform and mechanically coupled to the telescoping internal frame.

3. The multi-use mobile robot according to claim 1, further comprising:
   a pair of payload surfaces disposed on opposing sidewall panels of the internal telescoping frame, wherein the pair of payload surfaces are configured to support a payload in the second configuration.

4. The multi-use mobile robot according to claim 1, further comprising a replaceable power storage unit configured to provide power to an actuator onboard the multi-use mobile robot.

5. The multi-use mobile robot according to claim 1, wherein in the first configuration, the multi-use mobile robot is configured to:
   transport the passenger while in the first configuration via a control command input to a wireless control unit;
   transport the passenger via a steering mechanism controlled by a person behind the multi-use robot; and
   transport the passenger via the steering mechanism, while the passenger stands on the base platform.

6. The multi-use mobile robot according to claim 1, further comprising a plurality of payload surfaces disposed on the opposing sidewall panels of the internal telescoping frame.

7. The multi-use mobile robot according to claim 1, further comprising a foldable seat actuator disposed on a sidewall of the telescoping internal frame, wherein the robot controller is further configured to execute the executable instructions to:
   receive a command to deploy the first configuration; and
   responsive to the command, actuate the foldable seat actuator to change a fold position of a foldable seat to a position generally parallel with the base platform when in the second configuration and at an angle with respect to the base platform when in the first configuration.

8. The multi-use mobile robot according to claim 7, wherein the foldable seat is removable from the multi-use robot.

9. The multi-use mobile robot according to claim 1, further comprising:
   a steering mechanism pivotably disposed on a top portion of the telescoping internal frame, wherein the steering mechanism is controllable in the first configuration by a person riding inside of the multi-use robot or an operator proximate the multi-use robot.

10. The multi-use mobile robot according to claim 9, wherein the steering mechanism is a handlebar comprising one or more rotatable handles, and wherein the robot controller is further configured to execute the executable instructions to:
    rotate axially to control the wheel actuator to move the multi-use robot with a velocity associated with a degree of rotation of the one or more rotatable handles.

11. The multi-use mobile robot according to claim 9, wherein the steering mechanism is a handlebar disposed in mechanical or electrical communication with one or more steering linkages, and wherein the robot controller is further configured to execute the executable instructions to:
    rotate the handlebar to control the wheel actuator to steer the multi-use robot with an angular turn that changes an angular path of travel, where a degree of rotation of the steering mechanism is associated with a steering direction.

12. The multi-use mobile robot according to claim 11, wherein a wireless control unit disposed in wireless or wired communication with the controller sends a command that controls angular momentum of the multi-use robot such that a user may sit or stand in the multi-use robot or stand behind the multi-use robot and perform one or more robot control operations comprising causing a change in direction of the multi-use robot, changing an angular momentum of the multi-use robot, and controlling a conveyor mechanism.

13. The multi-use mobile robot according to claim 12, further comprising a wireless control unit comprising a biometric sensor configured to receive fingerprint information to authenticate a user in the first configuration or the second configuration.

14. The multi-use mobile robot according to claim 1, further comprising:
    a set of parallel conveyor mechanisms disposed on opposing sidewall panels of the internal telescoping frame, the set of parallel conveyor mechanisms comprising a first conveyor and a second conveyor disposed in communication with the robot controller; and
    a set of payload surfaces disposed on a top portion of the set of parallel conveyor mechanisms, wherein the set of payload surfaces comprise a pair of payload surfaces mechanically rotatable responsive to receiving a drive signal from the robot controller;
    wherein the robot controller is further configured to execute the executable instructions to:
        actuate the conveyor mechanism in the first configuration; and
        convey the cargo along the set of payload surfaces by rotating the conveyor mechanism such that the cargo changes position with respect to a back internal frame wall of the telescoping internal frame.

15. A multi-use mobile robot comprising:
    one or more wheels mechanically drivable by a wheel actuator to drive the multi-use robot;
    a base platform comprising a telescoping internal frame configured to support a passenger in a first configuration and carry cargo in a second configuration; and
    a robot controller comprising a memory for storing executable instructions, the robot controller configured to execute the executable instructions to:
        transport the passenger in the first configuration; and
        transport the cargo disposed on a cargo surface of the telescoping internal frame in the second configuration;
    a foldable seat actuator disposed on a sidewall of the telescoping internal frame, wherein the robot controller is further configured to execute the executable instructions to:
    receive a command to deploy the first configuration; and
    responsive to the command, actuate the foldable seat actuator to change a fold position of a foldable seat to a position generally parallel with the base platform when in the second configuration and at an angle with respect to the base platform when in the first configuration.

16. A multi-use mobile robot comprising:
    one or more wheels mechanically drivable by a wheel actuator to drive the multi-use robot;
    a base platform comprising a telescoping internal frame configured to support a passenger in a first configuration and carry cargo in a second configuration; and
    a robot controller comprising a memory for storing executable instructions, the robot controller configured to execute the executable instructions to:
        transport the passenger in the first configuration; and
        transport the cargo disposed on a cargo surface of the telescoping internal frame in the second configuration;
    a steering mechanism pivotably disposed on a top portion of the telescoping internal frame, wherein the steering mechanism is controllable in the first configuration by a person riding inside of the multi-use robot or an operator proximate the multi-use robot.

17. A multi-use mobile robot comprising:
    one or more wheels mechanically drivable by a wheel actuator to drive the multi-use robot;
    a base platform comprising a telescoping internal frame configured to support a passenger in a first configuration and carry cargo in a second configuration; and
    a robot controller comprising a memory for storing executable instructions, the robot controller configured to execute the executable instructions to:
        transport the passenger in the first configuration; and
        transport the cargo disposed on a cargo surface of the telescoping internal frame in the second configuration;
    a set of parallel conveyor mechanisms disposed on opposing sidewall panels of the internal telescoping frame, the set of parallel conveyor mechanisms comprising a first conveyor and a second conveyor disposed in communication with the robot controller; and
    a set of payload surfaces disposed on a top portion of the set of parallel conveyor mechanisms, wherein the set of payload surfaces comprise a pair of payload surfaces mechanically rotatable responsive to receiving a drive signal from the robot controller;
    wherein the robot controller is further configured to execute the executable instructions to:
    actuate the conveyor mechanism in the first configuration; and convey the cargo along the set of payload surfaces by rotating the conveyor mechanism such that the cargo changes position with respect to a back internal frame wall of the telescoping internal frame.

\* \* \* \* \*